US009874459B2

(12) United States Patent
Najafi et al.

(10) Patent No.: US 9,874,459 B2
(45) Date of Patent: Jan. 23, 2018

(54) ACTUATION AND SENSING PLATFORM FOR SENSOR CALIBRATION AND VIBRATION ISOLATION

(71) Applicant: THE REGENTS OF THE UNIVERSITY OF MICHIGAN, Ann Arbor, MI (US)

(72) Inventors: Khalil Najafi, Ann Arbor, MI (US); Ethem Aktakka, Ann Arbor, MI (US)

(73) Assignee: THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 157 days.

(21) Appl. No.: 15/051,752

(22) Filed: Feb. 24, 2016

(65) Prior Publication Data
US 2016/0245667 A1    Aug. 25, 2016

Related U.S. Application Data

(60) Provisional application No. 62/119,979, filed on Feb. 24, 2015.

(51) Int. Cl.
*G01C 25/00* (2006.01)
*G01P 21/00* (2006.01)
*G01C 19/5783* (2012.01)

(52) U.S. Cl.
CPC ....... *G01C 25/005* (2013.01); *G01C 19/5783* (2013.01)

(58) Field of Classification Search
CPC ... G01C 25/005; G01C 19/5783; G01P 21/00; G01P 15/097
See application file for complete search history.

(56) References Cited

U.S. PATENT DOCUMENTS 5,760,290 A * 6/1998 Ueyanagi ............ G01P 15/0802
73/1.38
6,778,924 B2   8/2004 Hanse
(Continued)

OTHER PUBLICATIONS

Aktakka et al "A Microactuation and Sensing Platform With Active Lockdown for In Situ Calibration of Scale Factor Drifts in Dual Axis Gyroscopes" IEEE/ASME Transactions on Mechatronics vol. 20-2 (Jun. 11, 2014).

*Primary Examiner* — David A Rogers
(74) *Attorney, Agent, or Firm* — Harness, Dickey & Pierce, P.L.C.

(57) ABSTRACT

A micro-system with integrated multi-axis actuation and sensing capabilities for in-situ calibration of long-term scale-factor drifts in the output signal of attached or monolithically integrated inertial sensors. The micro-system comprises a piezoelectric actuator, integrated position sensors, and a controller. The controller provides the electrical excitation signals to the actuator and receives and processes signals from the inertial sensors and the position sensors. The electrical excitation signals are adjusted to reduce undesired off-axis motion resulting from environmental vibration during operation or from misalignment and digressions from the process tolerance during fabrication. Capacitive position sensors allow for determination of the trajectory of the piezoelectric actuator and for electrostatic pull-down and lock-down of an actuation plate. Piezoelectric signals and piezoresistive signals are used to improve position sensing precision. The actuator trajectory and the corresponding output of the inertial sensors are used by the controller to determine the device parameters of the inertial sensors.

21 Claims, 21 Drawing Sheets

(56) References Cited

U.S. PATENT DOCUMENTS

| | | |
|---|---|---|
| 7,649,305 B2 | 1/2010 | Priya et al. |
| 8,136,400 B2 * | 3/2012 | Axelrod .............. G01P 15/0802 |
| | | 73/510 |
| 8,354,778 B2 | 1/2013 | Arnold et al. |
| 8,583,392 B2 | 11/2013 | Panagas |
| 8,680,752 B2 | 3/2014 | Ayazi et al. |
| 2013/0233075 A1 * | 9/2013 | Schofield ........... G01C 19/5733 |
| | | 73/504.12 |
| 2014/0372063 A1 | 12/2014 | Niu et al. |
| 2016/0025492 A1 * | 1/2016 | Rocchi ............... G01C 19/5712 |
| | | 73/504.08 |

* cited by examiner

Linear motion in Y & Z axes and tilting motion around X-axis of the center platform with respect to the secondary frame Linear motion in X & Z axes and tilting motion around Y-axis of the secondary frame with respect to the primary frame

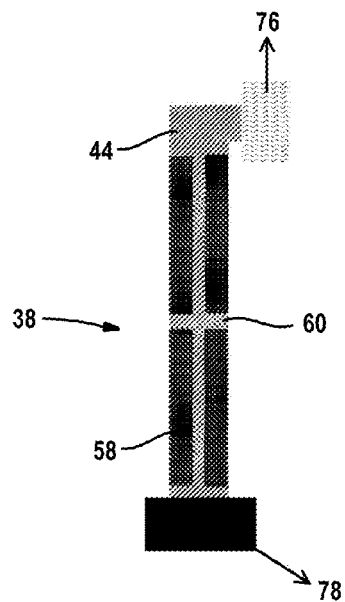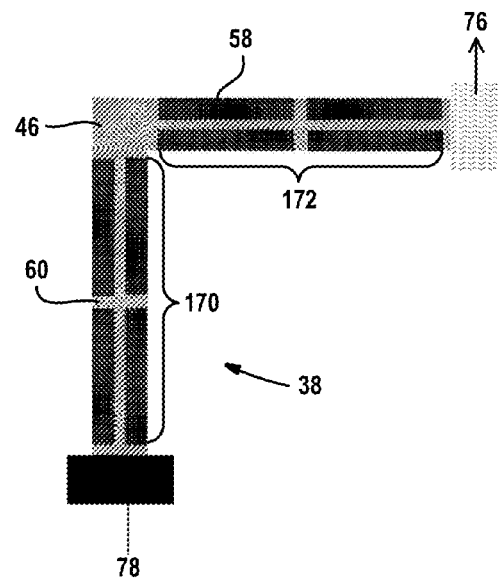
FIG. 4A                FIG. 4B
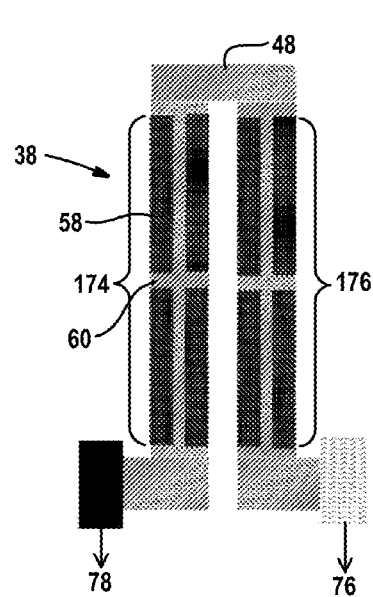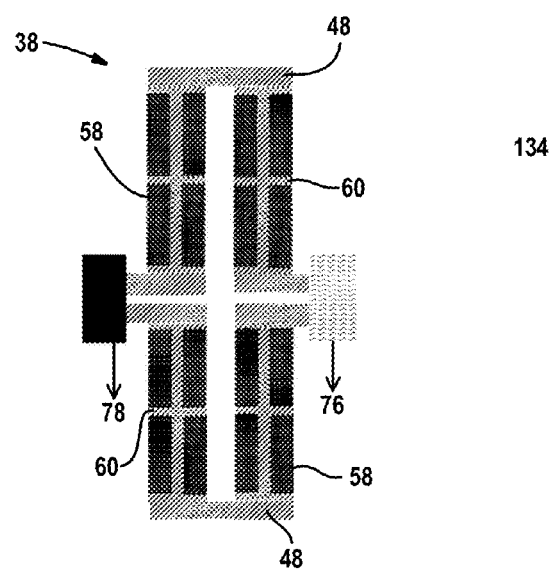
FIG. 4C                FIG. 4D

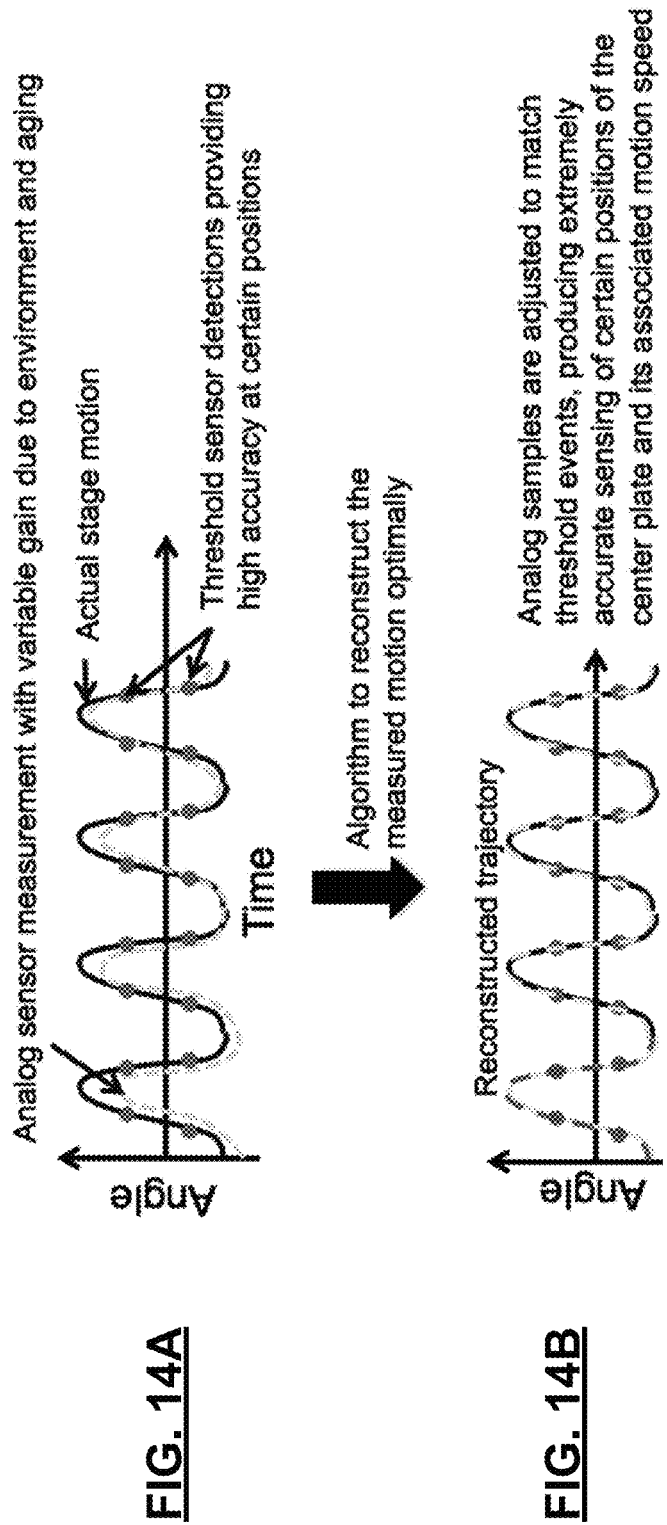

Applying electrical field between the capacitive sensing elements 100 to electrostatically pull-down the actuo-template 34 on the fixed member 102

ACTUATION AND SENSING PLATFORM FOR SENSOR CALIBRATION AND VIBRATION ISOLATION

CROSS-REFERENCE

This application claims the benefits of U.S. Provisional Application No. 62/119,979 filed Feb. 24, 2015. The entire disclosure of the above application is incorporated herein by reference.

GOVERNMENT

This invention was made with government support under W31P4Q-12-1-0002 awarded by the Army/AMC. The Government has certain rights in this invention.

FIELD

The present disclosure relates to a micro-system with integrated multi-axis actuation and position sensing capabilities for in situ calibration of long-term scale-factor drifts in the output signal of an inertial sensor.

BACKGROUND

Micromachined inertial measurement units (IMUs) have seen a steady improvement in their performance, with recent reports of microelectromechanical systems (MEMS) gyroscopes demonstrating bias stability of 0.1-1°/hr and angular random walk (ARW) of 0.01-0.1°/√hr. However, long-term drifts in scale-factor (gain) and bias still limit the potential of the inertial sensors in high accuracy strategic and navigation applications. To achieve higher performance and reliability of the inertial sensors there needs to be not just new inertial sensor designs, but also an integration of smart control functions for self-testing and self-calibration. In addition to self-compensation of bias drifts, it is highly desirable to integrate on-chip scale factor calibration mechanisms in order to improve the long-term output stability of inertial sensors against various factors such as aging, humidity, shock, external vibration, temperature variation, and temperature cycling.

Previously reported self-test and self-calibration methods for improvement of bias and gain stability in inertial sensors, includes on-chip calibration of scale factor against temperature variation by tracking the drive-mode resonance frequency for temperature sensing, thus reducing the scale factor error to 700 ppm in a small temperature range. Another self-calibration method is to use the gravitational force on the gyroscope proof mass as a reference for the Coriolis force, while a 1.2% deviation is measured between self-tested and actual scale factors. Another on-chip scale factor calibration method is to create a virtual rate input on the gyroscope as an input reference.

In another example, amplitude-modulated electrostatic excitation is applied to the drive and sense electrodes to mimic the Coriolis force resulting from an external rotation, while the phase-shift of the device output is measured. In such instances, to obtain the actual read-out scale factor, the measured calibration scale factor is readjusted by a ratio depending on the angular gain and the frequency split between resonance modes. The gain adjustment may introduce some inaccuracies, including a matching error between the estimated and rate-table measured scale factors of 3%.

In another example, additional electrostatic comb-drive electrodes are excited with a modulated signal constructed from virtual vibration velocity and virtual angular rate signals. After the gain adjustment of the measured frequency response, which is based on the gyroscope and driving parameters, the scale factor and bandwidth are determined within the 3% deviation of rate-table measurements. In some instances, a virtual input rate can be introduced to a closed-loop operated vibratory gyroscope by injecting a known square-wave modulated dither signal at a frequency out of the force-rebalance bandwidth. Such results in a deviation of the vibration pattern angle of the gyroscope from its nominal null position through the use of whole-angle mode. Thus, scale factor drifts are continuously observed and compensated with 350 ppm RMS accuracy between true and estimated values at 25° C. to 35° C.

As seen, in virtual-rate calibration methods, the use of emulated Coriolis forces require an additional gain adjustment in the output and is subject to possible deviation in excitation amplitude resulting from aging, which may limit the accuracy of measured scale factor in long-term field use. An alternative approach is to provide controlled on-chip physical stimuli for in situ measurement and recalibration of signal drift from an inertial sensor. This approach requires a compact and low-power micro-actuator that can produce the required reference calibration signals with minimum wobble or noise while not causing any degradation in gyroscope performance, as well as a precise motion sensing and estimation method.

In one example, integration of both an electromagnetic micro-actuator and an accelerometer on a same platform is disclosed. Specifically, where piezoresistive sensing and an over-range stopper are used to provide a reference impact. However, in such instances, self-calibration is not demonstrated and the measured actuation displacement is very small, approximately 2 nm.

In another example, co-fabrication of an SOI gyroscope on an electrostatic in-plane vibratory actuation platform is disclosed. In such instances, an open-loop high-frequency angular oscillation is used as a reference signal for calibration. Although self-measurement of frequency response of the detection oscillator is shown, the on-chip scale factor calibration or output comparison to rate-table characterization is not demonstrated.

In another example, preliminary results are collected for micro-scale rotary motors based on magnetoelastic, ultrasonic, and electrostatic actuation mechanisms. The goal in collecting such information is to calibrate a gyroscope mounted on the moving rotary stage by applying known continuous rotational rates (carouseling) or ±180° bidirectional dithering (maytagging). However, there are several challenges to overcome in applying such a method. The challenges include integration of reliable electrical connections between stator and rotor, active/passive shock protection mechanisms, and minimization of wobble and lateral slop during actuation.

This section provides background information related to the present disclosure which is not necessarily prior art.

SUMMARY

This section provides a general summary of the disclosure, and is not a comprehensive disclosure of its full scope or all of its features.

This disclosure reports a micro-system with integrated multi-axis actuation and sensing capabilities for in situ calibration of long-term scale-factor drifts in the output signal of generic microelectromechanical system (MEMS) inertial sensors. The micro-system comprises a piezoelectric actuator that provides periodic vibratory excitations that are used as reference stimuli in the calibration of a micromachined inertial sensor. The inertial sensor is attached on or integrated into the actuation plate. The actuator is also used to compensate for undesired off-axis motion. Undesired off-axis motion may result from environmental vibration during the operation of the actuation plate or from any misalignment and digressions from the process tolerance that occurs during fabrication of the actuation plate.

Capacitive sensors are attached on or integrated into the micro-system or on a separate fixed member. The capacitive sensors allows for precise determination of the applied physical stimulus and the motion trajectory of the actuation plate. For high accuracy detection of the applied reference stimulus, the capacitive sensing elements are arranged in a specific geometry that provides a combination of analog and threshold position sensing outputs. The analog capacitive sensing outputs provide an estimation of the motion trajectory at all sampling points. However, the analog sensing outputs are susceptible to gain errors due to aging, temperature, outputs provide high accuracy velocity measurements at only certain fixed points in the motion trajectory. However, the threshold sensing outputs are relatively insensitive to sensor gain errors, temperature changes, and environmental noise. The threshold position sensing is achieved by detecting peak capacitance between sets of electrodes symmetrically arranged around the center of the actuation plate in motion. When the micro-system is not used for calibration, the capacitive sensing electrodes are utilized for electrostatic pull-down and position lock-down of the actuation plate, in order to provide protection against environmental vibration and shocks.

In addition to the capacitive sensors attached on or integrated into the micro-system, piezoelectric signals or piezoresistive sensing from the connecting members of the micro-system can be used to improve sensing precision. A feedback control system with a variation of a Kalman filter can also be used to improve the position estimation.

Because the micro-system can operate in multiple axes, it can be integrated with and used to test a multi-axis inertial sensing unit (IMU) within the single device packaging. The presently described micro-system can be adapted as a universal system-in-package solution, which can provide precise physical reference inputs in the full sensing range for calibration of multi-axis inertial sensors. Furthermore, the presently described micro-system can be used to investigate the effect of cross-axis coupling, excitation frequency, and linear acceleration on a gyroscope output. Moreover, the presently described micro-system can be used as an active vibration isolation table for various micromachined sensors or optical devices by active piezoelectric damping of the high-frequency ambient vibrations, which improves the device performance in harsh environments.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 4A-4D are top-down views of exemplary connecting members.

FIGS. 14A-14B show a combination of analog and threshold sensing samples used to reconstruct the measured trajectory.

Corresponding reference numerals indicate corresponding parts throughout the several views of the drawings.

DETAILED DESCRIPTION

Example embodiments will now be described more fully with reference to the accompanying drawings.

The microvibratory actuation and sensing platform ("micro-system") 30 has integrated multi-axis actuation and position sensing capabilities for in situ calibration of output signals of long-term scale-factor drifts in scale factor (gain) and bias in the output signal of an inertial sensor.

Figure 1:
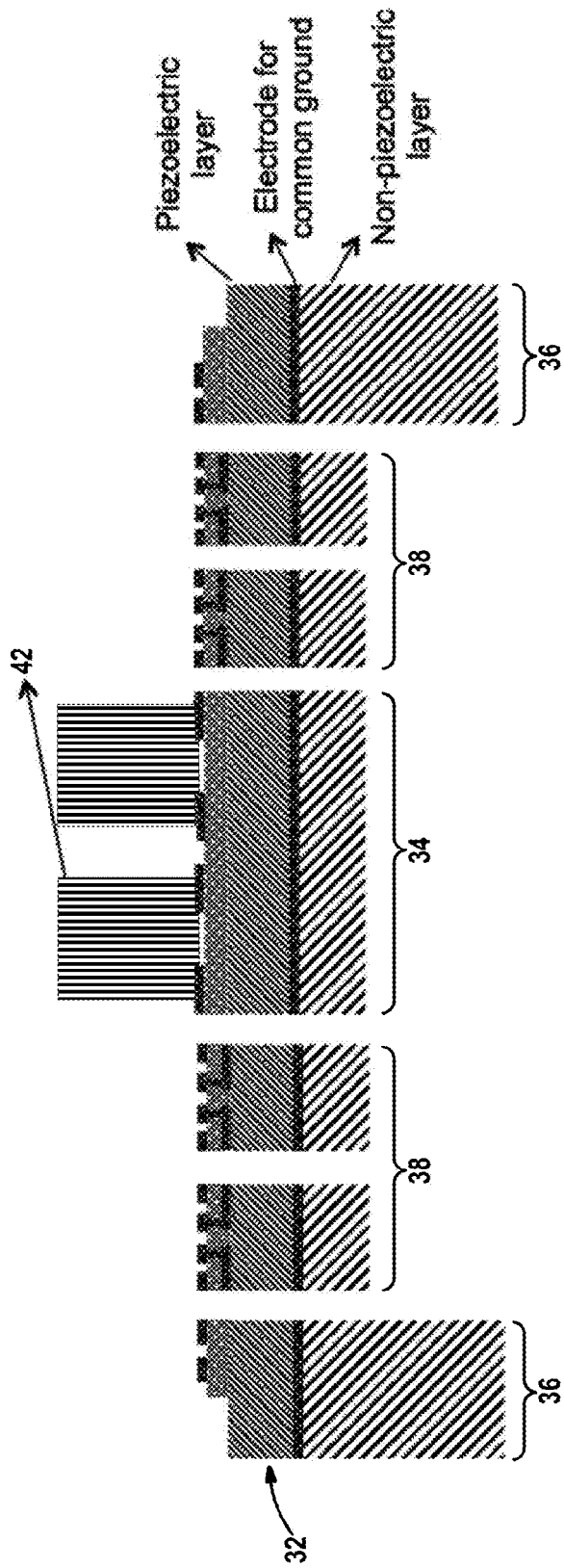
FIG. 1 is a cross-sectional view of an exemplary micro-system including an actuator and a plurality of sensors.

As seen in FIG. 1, the micro-system 30 comprises an actuator 32 and an inertial sensor 42. The actuator 32 comprises an actuation plate 34, a primary frame 36, and a plurality of connecting members 38. For example only, the actuator 32 may comprise a 2.3×2.3 $mm^2$ sized actuation plate 34 and four connecting members 38 that are 55-μm thick and 100-μm wide.

The inertial sensor 42 is attached to or integrated into the actuation plate 34 of the actuator 32. The inertial sensor 42 is a multi-axis inertial sensing unit (IMU). The actuator 32 provides periodic vibratory (angular/translation) excitations to the inertial sensor 42. The periodic vibratory excitations are used as reference stimuli for in situ calibration of the inertial sensor. A common geometric plane passes through each of the inertial sensor 42, the actuation plate 34, the primary frame 36, and the connecting members 38. The two largest dimensions of one of the plurality of connecting members 38, the primary frame 36, or the plate 34 define a geometric plane that is parallel to the common geometric plane.

The micro-system 30 may further include one or more other sensors or sensing elements, including additional inertial sensors, optical sensors, energy harvesters, gyroscopes, and other transducers. The one or more other sensors or sensing elements may be attached to or integrated into the actuation plate 34, the connecting members 38, or a separate fixed member 102. The one or more other sensors or sensing elements may be position sensing elements, such as capacitive sensing elements 100 or piezoresistive sensing elements 126.

As seen in FIGS. 2A-2D, the primary frame 36 of the actuator 32 is fixed and defines an inner portion 40. The actuation plate 34 and the plurality of connecting members 38 are disposed within the inner portion. The plurality of connecting members 38 are arranged around the actuation plate 34. The plurality of connecting members 38 may be arranged symmetrically around the actuation plate 34. Alternatively, the connecting members 38 may be arranged asymmetrically around the actuation plate 34 (not shown).

Figure 2A:
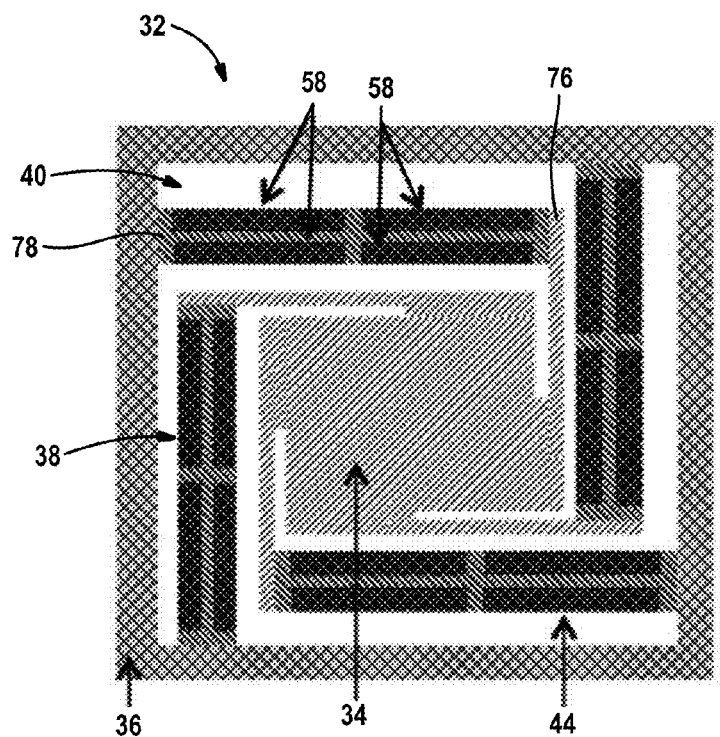
FIGS. 2A-2D are cross-sectional views of exemplary actuators.
Figure 2B:
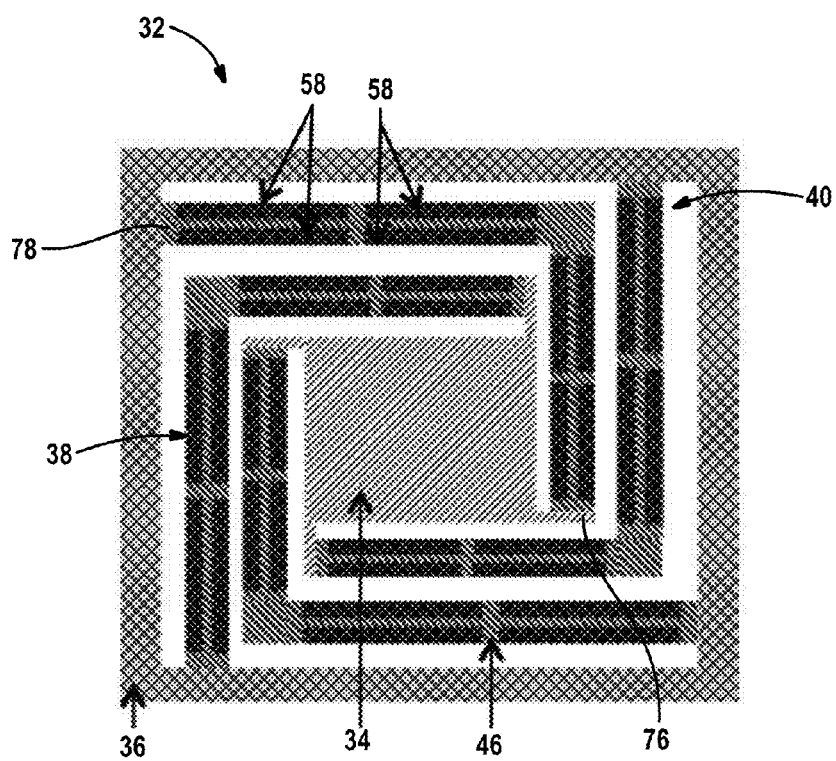
Figure 2C:
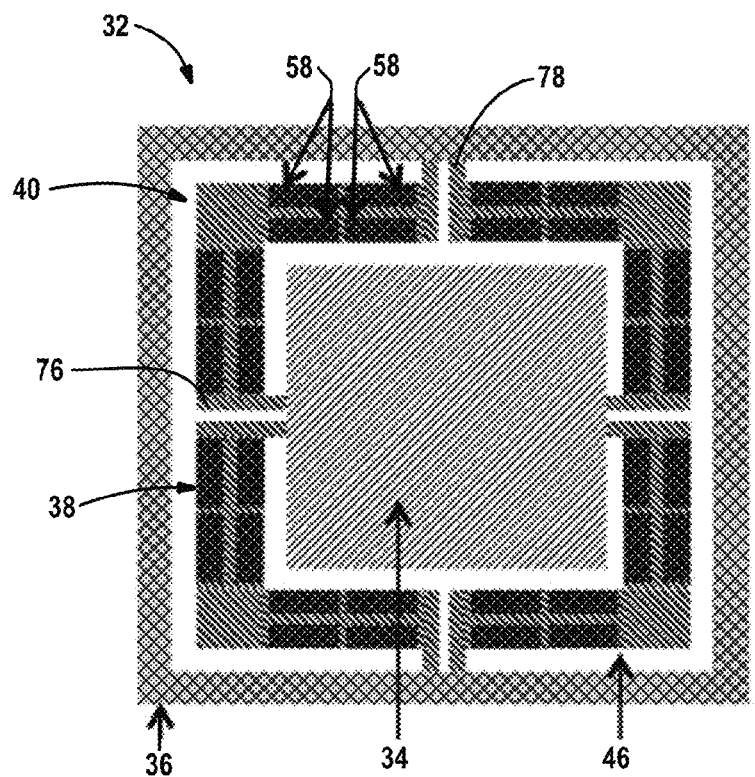
Figure 2D:
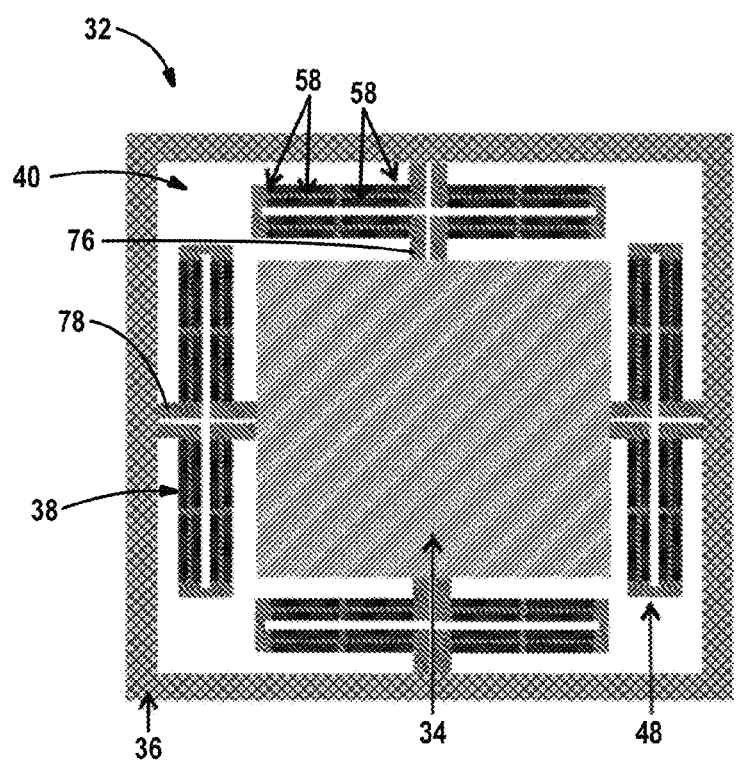

In one embodiment, as seen in FIG. 2A, the connecting members 38 may have a single beam shape 44. In other embodiments, as seen in FIGS. 2B and 2C, the connecting members 38 have a top-down "L" shape 46. In other embodiments, as seen in FIG. 2D, the connecting members 38 have a top-down "U" shape 48.

The shown L-shape connecting members 46 and U-shape connecting members 48, enable balanced multi-axis motion of the actuation plate 34 along different axes. The L-shape 46 and U-shape 48 also allow for in-plane relaxation of any residual stress resulting from temperature variations. However, it is recognized that the connecting members 38 may take the form of other shapes in other embodiments that allow for these same or additional functions.

Figure 3A:
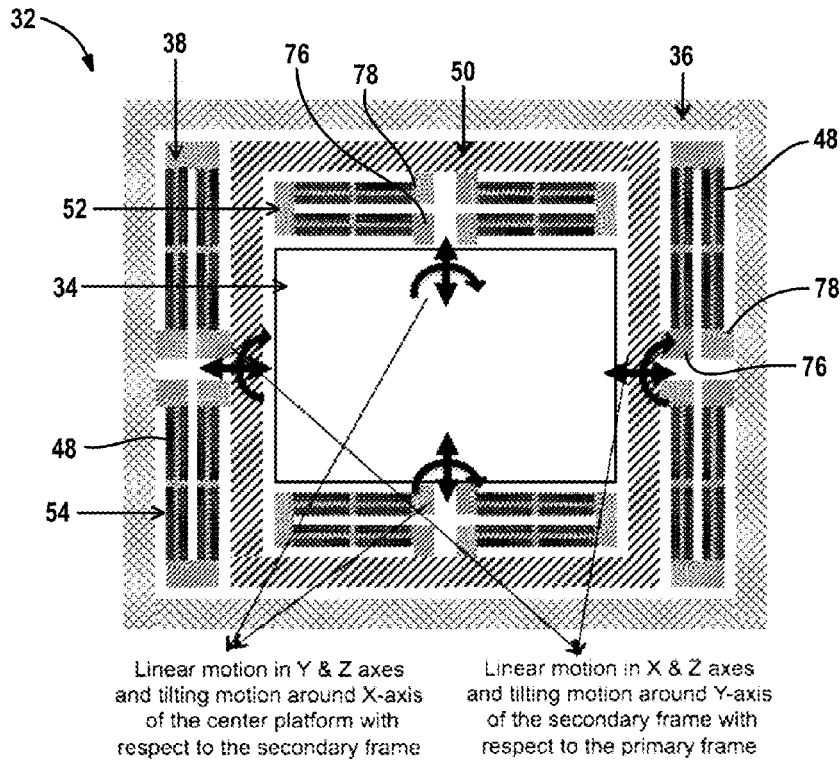
FIGS. 3A-3B are cross-sectional views of exemplary actuators having a secondary frame.
Figure 3B:
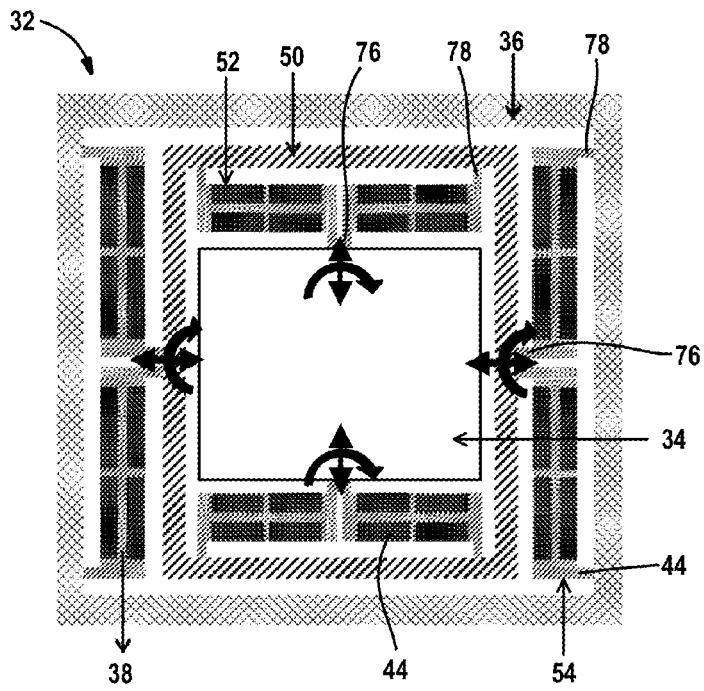

In another form, as seen in FIGS. 3A and 3B, the actuator 32 may further comprise a secondary frame 50. In such instances, the plurality of connecting members 38 includes a first set of connecting members 52 and a second set of connecting members 54. The actuation plate 34, the secondary frame 50, and the plurality of connecting members 38, including the first set of connecting members 52 and the second set of connecting members 54, are disposed within the inner space. The first set of connecting members 52 attaches the actuation plate 34 to the secondary frame 50. The second set of connecting members 54 attaches the secondary frame 50 to the primary frame 36. The secondary frame 50 enables different in-plane vibrational modes to be distributed between the first set of connecting members 52 and the second set of connecting members 54.

The first set of connecting members 52 and the second set of connecting members 54 may similarly have a single beam shape 44, a top-down "L" shape, a top-down "U" shape, or an alternative shape. In one embodiment, as seen in FIG. 3A, both the first set of connecting members 52 and the second set of connecting members 54 have a U-shape 48. In another embodiment, as seen in FIG. 3B, both the first set of connecting members 52 and the second set of connecting members 54 have a single beam shape 44. It is recognized that in some embodiments the first set of connecting members 52 may have a different or additional shape from the shape of the second set of connecting members 54.

As seen in FIGS. 4A-4D, each connecting member 38 comprises a first end 76 and a second end 78. FIG. 4A depicts a connecting member 38 having a single beam shape 44 with a first end 76, a second end 78, and four partitioned surface electrodes 58 separated by a plurality of gaps 60.

FIG. 4B depicts a connecting member 48 having a L-shape 46 with a first end 76 and a second end 78. The L-shaped connecting member 46 has a first beam 170 and a second beam 172. The first beam 170 forms the vertical portion of the L-shaped connecting member 46. The second beam 172 forms the horizontal portion of the L-shaped connecting member 46. Four partitioned surface electrodes 58 separated by a plurality of gaps 60 are on both the first beam 170 and second beam 172 of the L-shaped connecting member 46.

FIG. 4C depicts a connecting member 48 having a U-shape 48 with a first end 76 and a second end 78. The U-shaped connecting member 48 has a first beam 174 parallel to a second beam 176. Four partitioned surface electrodes 58 separated by a plurality of gaps 60 are on both the first beam 174 and the second beam 176.

FIG. 4D depicts a connecting member 38 having a parallel-connection of two U-shaped connecting members 48. The two U-shaped connecting members 48 are as described in FIG. 4C. Each U-shaped connecting member has a first end 76 and a second end 78. Each U-shaped connecting member 48 has a first beam 174 parallel to a second beam 176. Four partitioned surface electrodes 58 separated by a plurality of gaps 60 are on both the first beam 174 and the second beam 176 of each U-shaped connecting member 48. In total, the connecting member 38 has sixteen partitioned surface electrodes 58, eight on each U-shaped connecting member 48, and four on each beam of the individual U-shaped connecting members 48.

In one embodiment, as seen in FIGS. 2A-2E, the first end of the connecting member 38 is attached to the actuation plate 34 and the second end of the connecting member is attached to the primary frame 36. In another embodiment, as seen in FIGS. 3A and 3B, the first set of connecting members 52 have a first end attached to the actuation plate 34 and a second end attached to the secondary frame 50. Similarly, the second set of connecting members 54, have a first end attached to secondary frame 50 and a second end attached to the primary frame 36.

Figure 5A:
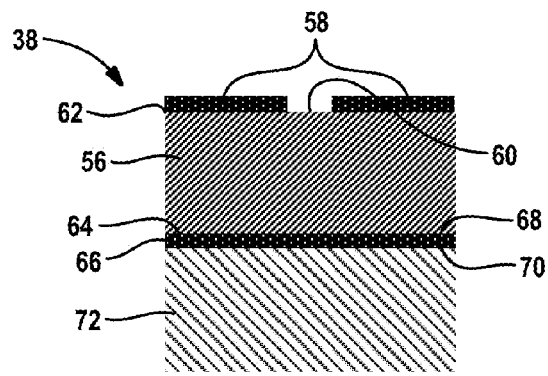
FIGS. 5A-5C are cross-sectional side views of exemplary connecting members.
Figure 5B:
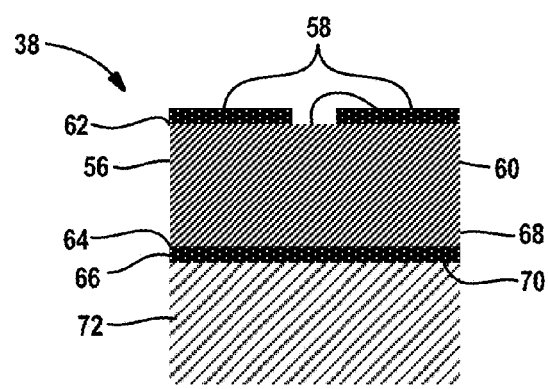
Figure 5C:
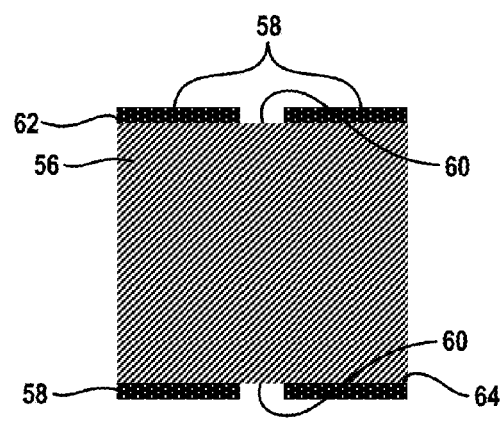

As seen in FIGS. 5A-5C, each connecting member 38 comprises at least one first piezoelectric material 56 and a plurality of partitioned surface electrodes 58 separated by a plurality of gaps 60. The first piezoelectric material 56 has a first surface 62 opposing a second surface 64. A first set of the plurality of partitioned surface electrodes 58 are disposed on the first surface of the first piezoelectric material 62 of each connecting member 38.

In one embodiment, as seen in FIGS. 5A and 5B, the second surface of the first piezoelectric material 64 is covered with a single surface electrode 66. In such instances, the single surface electrode 66 is used as a common ground. The single surface electrode 66 has a first surface 68 opposing a second surface 70. The first surface of the single surface electrode 68 faces the second surface of the first piezoelectric material 64.

In another embodiment, as seen in FIG. 5C, a second set of the plurality of partitioned surface electrodes 58 is disposed on the second surface of the first piezoelectric material 64.

In one embodiment, as seen in FIG. 5A, the connecting members 38 further include a non-piezoelectric material 72. In such instances, the connecting member 38 has a unimorph structure and the non-piezoelectric material 72 faces the second surface of the single surface electrode 70. To obtain maximum out-of-plane actuation range and to minimize static bending of the connecting members 38 having a unimorph structure resulting from residual stress at the interface between the first piezoelectric material 56 and the non-piezoelectric material 72, the z-axis centroid (not shown) of the connecting member 38 needs to be kept at the interface between the first piezoelectric material 56 and the non-piezoelectric material 72. This requirement influences the optimum thickness ratio of the first piezoelectric material 56 to the non-piezoelectric material 72.

In another embodiment, as seen in FIG. 5B, the connecting members 38 further include a second piezoelectric material 74. In such instances, the connecting member 38 has a bimorph structure and the second piezoelectric material 74 faces the second surface of the single surface electrode 70.

Figure 6A:
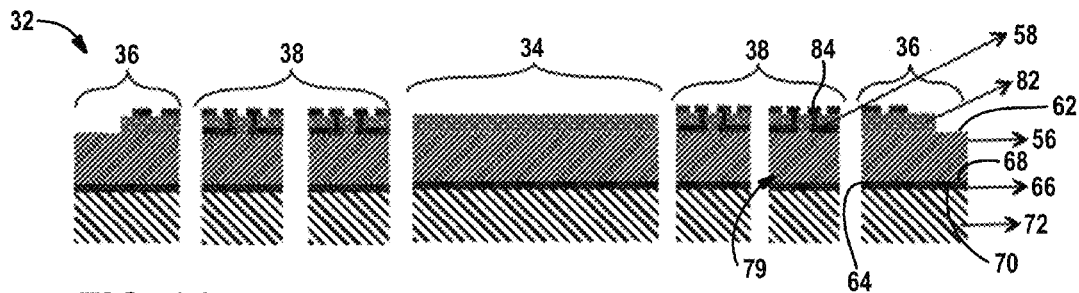
FIGS. 6A-6D are cross-sectional views of exemplary actuators.
Figure 6B:
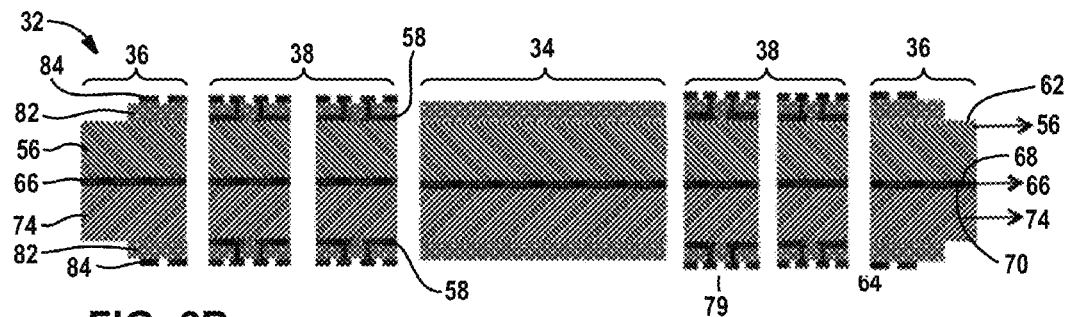
Figure 6C:
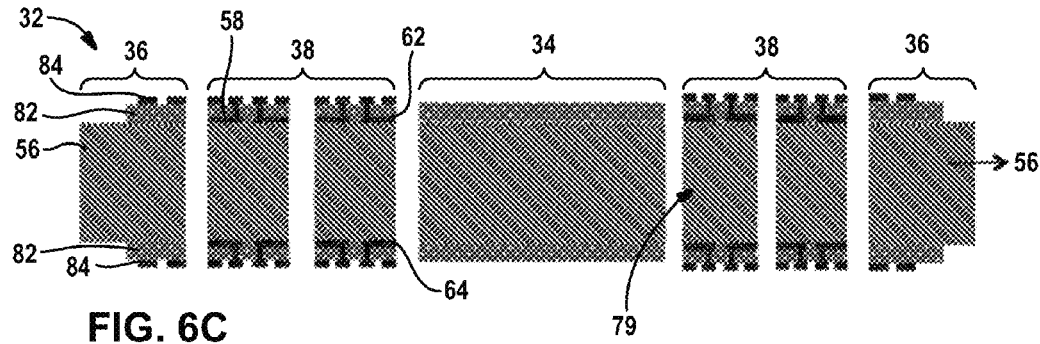
Figure 6D:
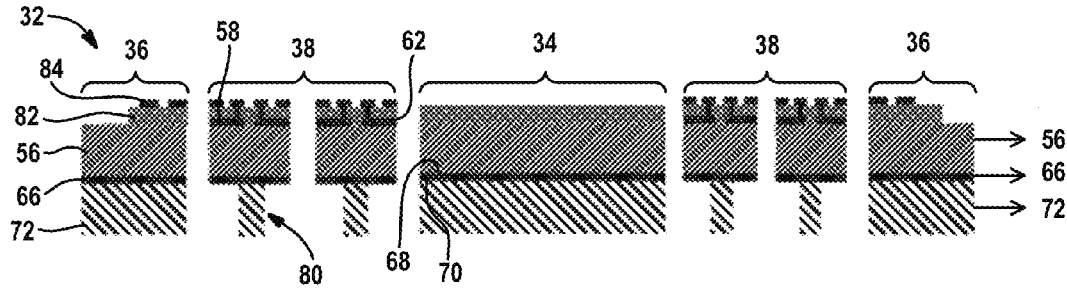

As seen in FIGS. 6A-6D, the connecting members 38 may have variety of cross-sectional shapes. In one embodiment, as seen in FIGS. 6A-6C, the connecting members 38 are rectangular cuboids. The connecting members 38 have a rectangular cross-section 79. In other embodiments, as seen in FIG. 6D, the connecting members 38 have a T-shaped cross section 80. In such instances, the non-piezoelectric material 72 (unimorph structured), or the second piezoelectric material 74 (bimorph structured), has a width that is less than the width of the first piezoelectric material 56.

FIG. 6A depicts an actuator 32 having an actuation plate 34, a primary frame 36, and a plurality of connecting members 38. Each connecting member 38 has a unimorph structure and a rectangular cross-section. Each connecting member 38 has a plurality of partitioned surface electrodes disposed on the first surface of the first piezoelectric material 62. An insulation layer 82 insulates the plurality of partitioned surface electrodes 58. The insulation layer 82 may comprise parylene, silicon oxide, or silicon nitride. The partitioned surface electrodes 58 form electrical connections with a partitioned metal layer 84. The first surface of the single surface electrodes 68 faces the second surface of the first piezoelectric material 62. The non-piezoelectric material 72 faces the second surface of the single surface electrodes 70. The actuation plate 34 and the primary frame 36 have a composition similar to that of the plurality of connecting members 38.

FIG. 6B depicts an actuator 32 having an actuation plate 34, a primary frame 36, and a plurality of connecting members 38. Each connecting member 38 has a bimorph structure and a rectangular cross-section. Each connecting member 38 has a plurality of partitioned surface electrodes disposed on the first surface of the first piezoelectric material 62. An insulation layer 82 insulates the plurality of partitioned surface electrodes 58. The insulation layer 82 may comprise parylene, silicon oxide, or silicon nitride. The partitioned surface electrodes 58 form electrical connections with a partitioned metal layer. The first surface of the single surface electrodes 68 faces the second surface of the first piezoelectric material 62. A first surface of the second piezoelectric material 86 faces the second surface of the single surface electrodes 70. A second surface of the second piezoelectric material 88 faces a second set of the plurality of partitioned surface electrodes 58, a second insulation layer 82, and a second partitioned metal layer 84. The actuation plate 34 and the primary frame 36 have a composition similar to that of the plurality of connecting members 38.

FIG. 6C depicts an actuator 32 having an actuation plate 34, a primary frame 36, and a plurality of connecting members 38. Each connecting member 38 has a first piezoelectric material 56 and a rectangular cross-section. Each connecting member 38 has a plurality of partitioned surface electrodes disposed on the first surface of the first piezoelectric material 62. An insulation layer 82 insulates the plurality of partitioned surface electrodes 58. The insulation layer 82 may comprise parylene, silicon oxide, or silicon nitride. The partitioned surface electrodes 58 form electrical connections with a partitioned metal layer. The second surface of the first piezoelectric material 64 faces a second set of the plurality of partitioned surface electrodes 58, a second insulation layer 82, and a second partitioned metal layer 84. The actuation plate 34 and the primary frame 36 have a composition similar to that of the plurality of connecting members 38.

FIG. 6D depicts an actuator 32 having an actuation plate 34, a primary frame 36, and a plurality of connecting members 38. Each connecting member 38 has a unimorph structure and a T-shaped cross-section. Each connecting member 38 has a plurality of partitioned surface electrodes disposed on the first surface of the first piezoelectric material 62. An insulation layer 82 insulates the plurality of partitioned surface electrodes 58. The insulation layer 82 may comprise parylene, silicon oxide, or silicon nitride. The partitioned surface electrodes 58 form electrical connections with a partitioned metal layer 84. The first surface of the single surface electrodes 68 faces the second surface of the first piezoelectric material 62. The non-piezoelectric material 72 faces the second surface of the single surface electrodes 70 and has a width that is less than the width of the first piezoelectric material 56. The actuation plate 34 and the primary frame 36 have a composition similar to that of the plurality of connecting members 38.

The actuator 32 is microfabricated via a water-level process comprising low-temperature diffusion solder bonding, precision lapping, and wet-etch patterning of high-quality bulk-PZT substrates on a SOI wafer. The water-level process allows a greater than average piezoelectric coupling ($k_{31}^2$) and strain coefficient ($d_{31}$) to be obtained. The inertial sensor 42 and other optical sensors, energy harvesters, and secondary transducer can be co-fabricated with the actuator 32 and monolithically integrated on the actuation plate 34. Co-fabrication of the plurality of sensors and the actuator 32 allows for the precise spatial alignment of the sensors and the actuation plate 34.

Figure 7:
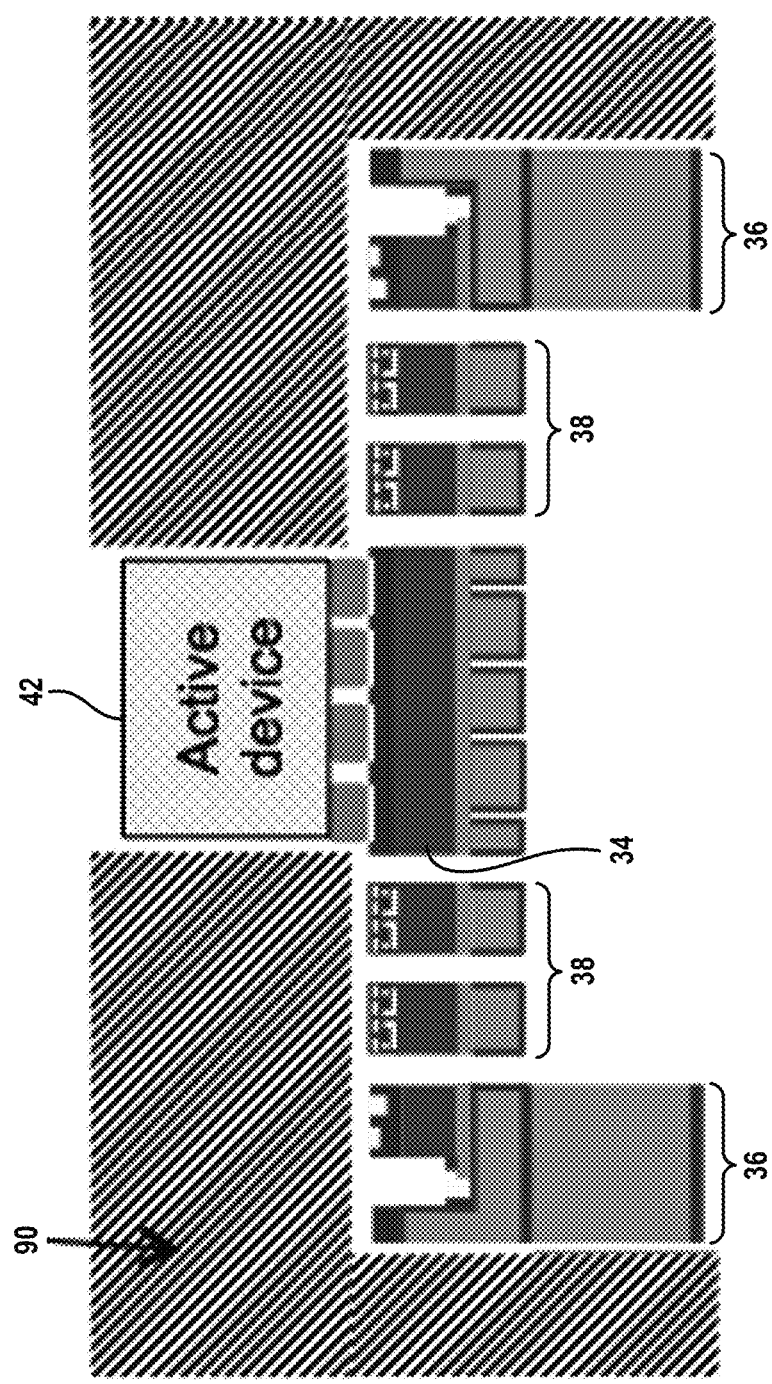
FIG. 7 is a cross-sectional of an exemplary micro-system having a removable jig used for alignment and attachment of an inertial sensor.

In other embodiments, the plurality of sensors are separately fabricated and monolithically integrated on the top or bottom of the actuation plate 34. Separately fabricated inertial sensors 42 can be attached on the actuation plate 34 through varying bonding methods, including epoxy bonding, eutectic bonding, and thermo-compression bonding. As seen in FIG. 7, to a jig 90 can be used for precise alignment of a separately fabricated inertial sensor 42 to the actuation plate 34. FIG. 7 depicts an actuator 32 comprising an actuation plate 34, a primary frame 36, and a plurality of connecting members, where the inertial sensor 42 is aligned with the actuation plate 34 using a removable silicon jig 90.

Figure 8:
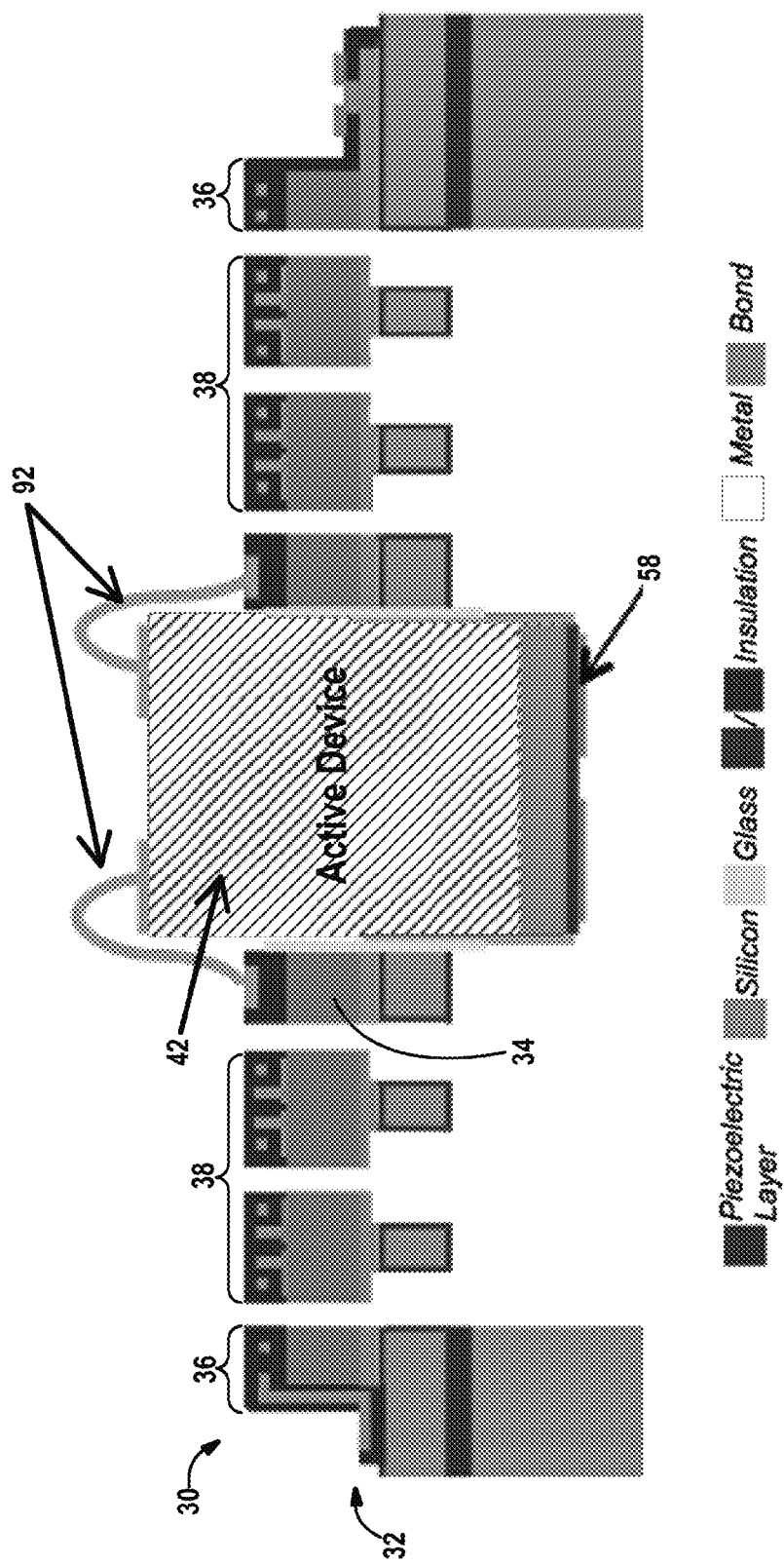
FIG. 8 is a cross-sectional of an exemplary micro-system wherein the inertial sensor is placed at the mass center of the actuation plate.

As seen in FIG. 8, the electrical interconnections to the inertial sensor 42 can be provided through wire bonds 92 stretching from the actuation plate 34 to the actuation plate 34. The wire bonds 92 are microfabricated highly-flexible parylene cables. In another embodiment (not shown), the electrical interconnections to the inertial sensor 42 are provided through metal interconnects integrated on the connecting members 38. The number of electrical interconnections to the inertial sensor 42 is determined by the number of pads available on the inertial sensor 42 for its control. The number of pads will vary according to the type of inertial sensor 42 selected.

When an inertial sensor 42 is attached to the actuation plate 34, either through co-fabrication or monolithic integration. The mass centroid of the actuator 32 and the inertial sensor 42 may not be aligned. If not aligned, then when held perpendicularly, the weight of the inertial sensor 42 load on the actuation plate 34 coupled with environmental vibration noise on the actuator 32 may cause a tilting motion of the actuation plate 34. As seen in FIG. 8, the tilting motion can be reduced by placing the inertial sensor 42 at the mass center of the actuation plate 34 along both the X-Y axis and the Z-axis and/or the stiffness of the connecting members 38 can be increased to reduce tilting motion.

FIG. 8 depicts a micro-system 30 comprising an actuator 32 with an attached or integrated inertial sensor 42. The actuator 32 includes an actuation plate 34, a primary frame 36, and a plurality of connecting members 38. The inertial sensor 42 is placed at the mass center of the actuation plate 34 in order to reduce tilting motion. Wire bonds 92 form electrical connections between the actuation plate 34 and the inertial sensor 42.

The actuator 32 provides periodic vibratory excitations that serve as a reference stimuli or signal in the calibration of the inertial sensor 42. The reference stimulus provides a periodic calibration trajectory and also drives the circuitry to physically actuate the actuation plate. The actuation plate 34 can be actuated in each degree-of-freedom consecutively to preform calibration of each attached or monolithically integrated sensor separately. Alternatively, the actuation plate 34 can be actuated in multiple degrees-of-freedom simultaneously to preform calibration of multiple attached or monolithically integrated sensors.

To actuate, the connecting members 38 of the actuator 32 are excited in a transverse piezoelectric mode (31-mode). The partitioned surface electrodes 58, disposed on the first surface of the first piezoelectric material 56 of each connecting member 38, are excited with respect to the single surface electrode 66, which results in a transverse piezoelectric mode (31-mode) actuation of the first piezoelectric material 56. To obtain the maximum tilting displacement of the actuation plate 34 across a reference axis all of the partitioned surface electrodes 58 are employed for actuation, all partitioned surface electrodes 58 are excited with respect to the single surface electrode 66. The reference axis is the axis of motion in which the actuator 32 is actuated. By varying the assigned voltage polarities and magnitude on the partitioned surface electrodes 58 of the plurality of connecting members 38 the actuation plate can be actuated in six degrees-of-freedom, including translational and angular motion in all X-Y-Z directions.

Figure 9A:
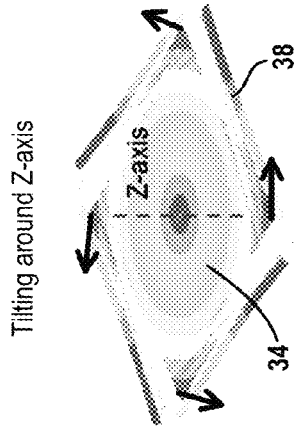
FIGS. 9A-9F show the excitation of the micro-system in six degrees-of-freedom.
Figure 9B:
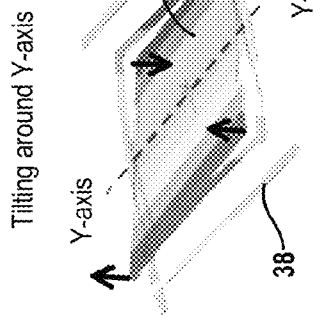
Figure 9C:
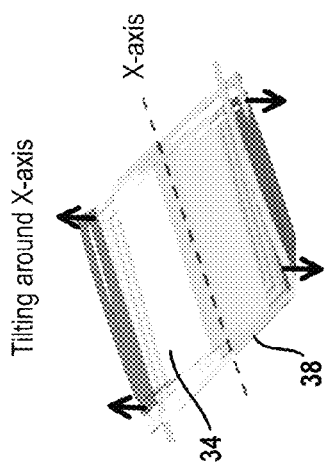
Figure 9D:
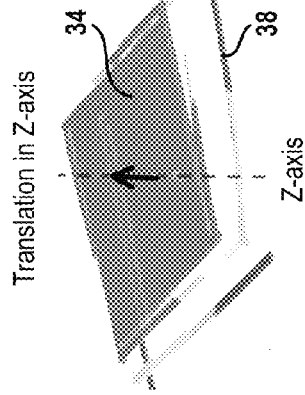
Figure 9E:
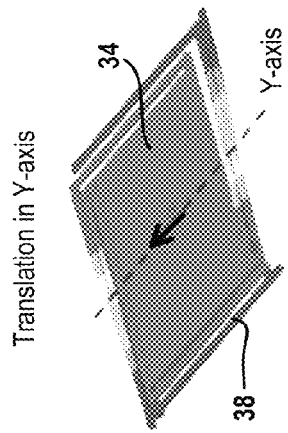
Figure 9F:
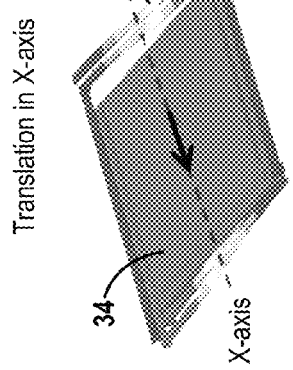

For example, FIG. 9A depicts tilting motion of the actuation plate 34 around the X-axis. FIG. 9B depicts tilting motion of the actuation plate 34 around the Y-axis. FIG. 9C depicts tilting motion of the actuation plate 34 around the Z-axis. FIG. 9D depicts translational motion of the actuation plate 34 around the X-axis. FIG. 9E depicts translational motion of the actuation plate 34 around the Y-axis. FIG. 9F depicts translational motion of the actuation plate 34 and connecting members 38 around the Z-axis.

FIGS. 9A-9F each depicts an actuation plate 34 and four connecting members 38 having a L-shape 46. The L-shaped connecting members 38 each have a first beam 170 and a second beam 172. Each of the beams 170, 172 of the plurality of connecting members 38 has four partitioned surface electrodes 58.

In another embodiment, instead of transverse-mode (31-mode) excitation, the partitioned surface electrodes 58 can be excited in a longitudinal-mode (33-mode). In such instances, the partitioned surface electrodes 58 are patterned as interdigitated fingers (not shown). The longitudinal-mode excitation will provide a similar magnitude of displacement as compared to the transverse-mode. However, the longitudinal-mode may require lower actuation voltage.

Figure 10:
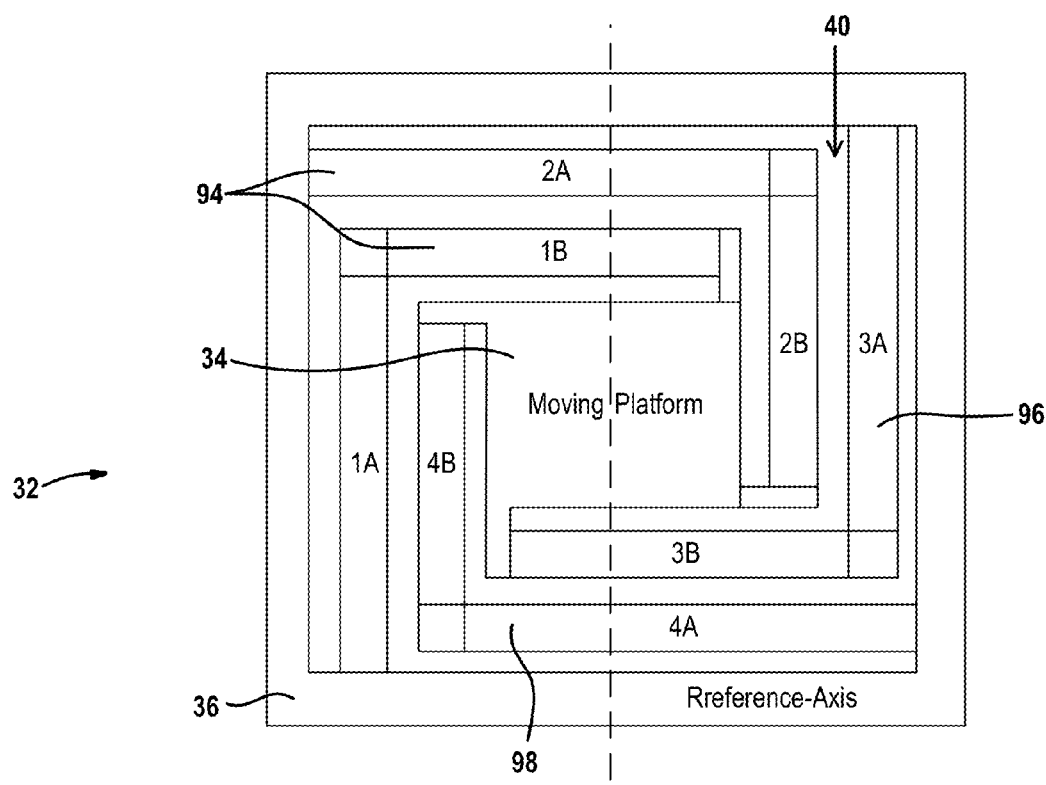
FIG. 10 shows the assignments of the partitioned surface electrodes for simultaneously obtaining vibratory tilting in the reference axis, compensation of cross-axis tilting, and sensing of the applied stimulus.

In another embodiment, as seen in FIG. 10, the plurality of connecting members 38, each including a plurality of partitioned surface electrodes 58, is broken into three working groups. In such instances, trajectory-sensing occurs simultaneously with the activation of the actuation plate 34. FIG. 10 depicts an actuator 32 having an actuation plate 34, a primary frame 36, and three working groups of connecting members 38 having a L-shape 46. A first group of connecting members 94 is used to provide vibratory tilting motion of the actuation plate 34. A second group of connecting members 96 is used to compensate for the off-axis motion in the out-of-plane direction. A third group of connecting members is used for integrated sensing of the applied trajectory and actuation rate.

Where the plurality of connecting members 38 is broken into working groups, the maximum displacement range during actuation is half the maximum displacement that would result from use of all of the connecting members 38 for actuation. However, a piezoelectric sensing signal is obtained from differential outputs of two partitioned surface electrodes 58 of the second group of connecting members 96, instead of a single-ended input from the partitioned surface electrodes 58 relative to the single surface electrode 66. Piezoelectric sensing signals are used to reduce common vibrational noise and the pyroelectric effect in the output signal. The piezoelectric sensing signal provides a rough estimation of the amplitude and trajectory of the reference stimulus. Though the piezoelectric sensing signal is highly sensitive, the gain of the piezoelectric sensing signal is dependent on temperature and susceptible to the aging effect common in ferroelectric materials. Resultantly, a sensing mechanism is employed to determine when the actuation plate 34 is at certain angular displacements.

When the actuation plate 34 is actuation it is expected to experience some undesired off-axis motion, despite a structural design and excitation scheme that is highly symmetric in the X-Y plane. The off-axis motion, results from cross coupling between the longitudinal and transverse modes within the connecting members 38. The use of connecting members 38 having an unimorph structure increases the cross coupling between actuation modes. Furthermore, the actuation plate 34 will experience some variations between the actuation characteristics of each connecting member. Such variations result from fabrication tolerances caused by limited precision after several consecutive lithography and etching steps, and also, by the finite spatial variations of material properties in the piezoelectric film. In addition to these actuator 32 imperfections, the alignment of the inertial sensor 42 and the actuation plate 34 may be imperfect because of die-level attachment tolerances in the X-Y-plane. The undesired out-of-plane cross-axis tilting during actuation resulting from imperfections of the actuator and the alignment may detrimentally affect the precision of the applied reference stimuli and the accuracy of the calibration.

To mitigate any affect, as seen in FIGS. 11A-11D the actuation plate 34 is counter-excited for actuation in the opposite direction of the undesired motion. The voltage amplitudes on the plurality of partitioned surface electrodes 58 are re-adjusted to create a counter displacement on the actuation plate 34 with the same amplitude, but in the opposite direction of the off-axis motion. By creating the counter displacement the undesired off-axis tilting motion is actively suppressed to 1% or less.

Figures 11A, 11B, 11C, 11D:
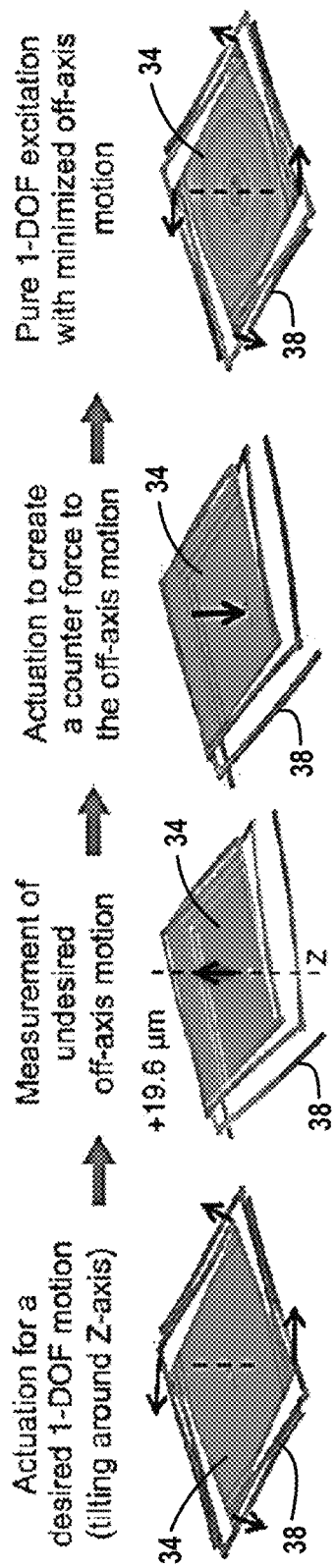
FIGS. 11A-11D shows a method for compensation of off-axis motion of the actuation plate.

FIG. 11A depicts an actuation plate 34 and the attached connecting members 38. The actuation plate 34 is actuated in the desired 1-degree-of-freedom motion. FIG. 11B depicts the same actuation plate 34 and attached connecting members 38 of FIG. 11A, wherein the undesired off-axis motion is measured. FIG. 11C depicts the same actuation plate and attached connecting members 38 of FIGS. 11A and 11B, wherein the voltage amplitudes on the plurality of partitioned surface electrodes 58 are re-adjusted to create a counter displacement on the actuation plate 34 with the same amplitude, but in the opposite direction of the off-axis motion. FIG. 11D depicts the same actuation plate and attached connecting members 38 of FIGS. 11A-11C, after the off-axis motion has been actively suppressed.

The micro-system 30 may further include capacitive sensing elements 100. The capacitive sensing elements 100 allow for high accuracy estimation of the motion trajectory of the actuation plate 34 and for precise determination of the applied physical stimulus. The estimated motion of the actuation plate 34 allows for compensation of undesired off-axis motion of the actuation plate 34. The capacitive sensing elements 100 provide sufficient resolution to continuously track the whole range of motion. The micro-system 30 may further include the capacitive sensing elements 100 when all of the partitioned surface electrodes 58 are used for actuation or in such instances where the plurality of connecting members 38 is broken into working groups and piezoelectric sensing signals are recorded. The capacitive sensing elements 100 can be integrated into the top or bottom surface of the actuation plate 34 (not shown).

Figure 12A:
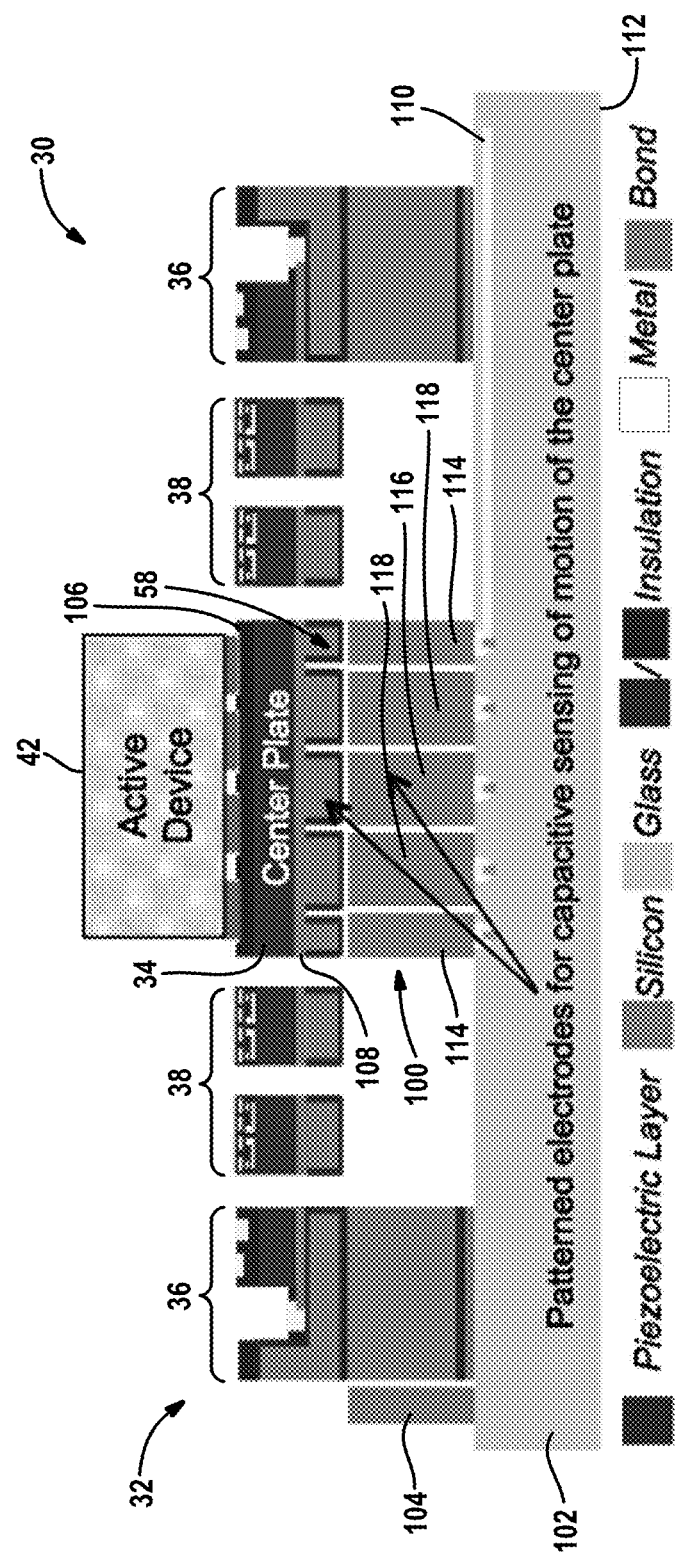
FIGS. 12A-12C are cross-sectional views of exemplary micro-systems having capacitive sensing elements on a fixed member.
Figure 12B:
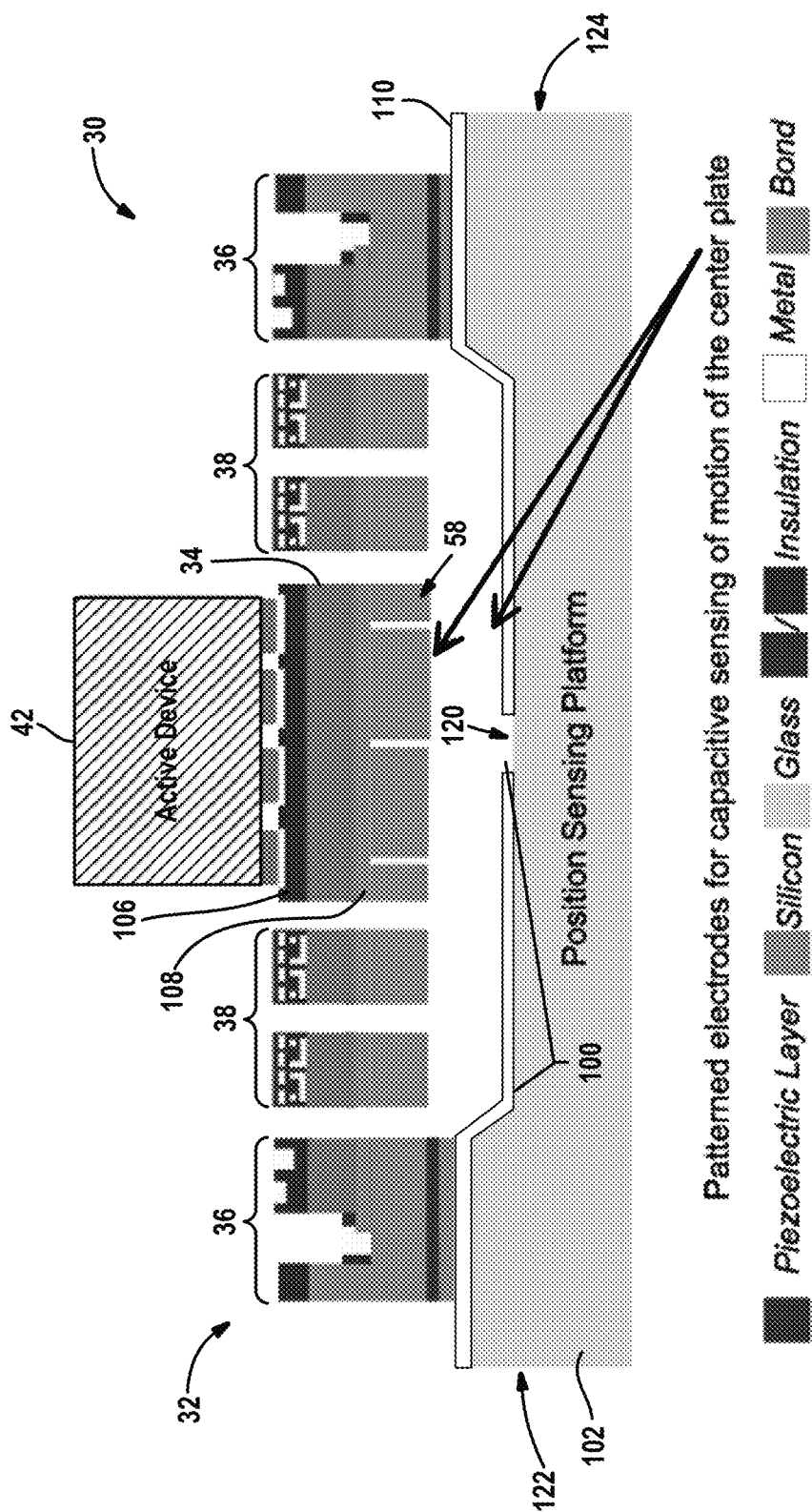
Figure 12C:
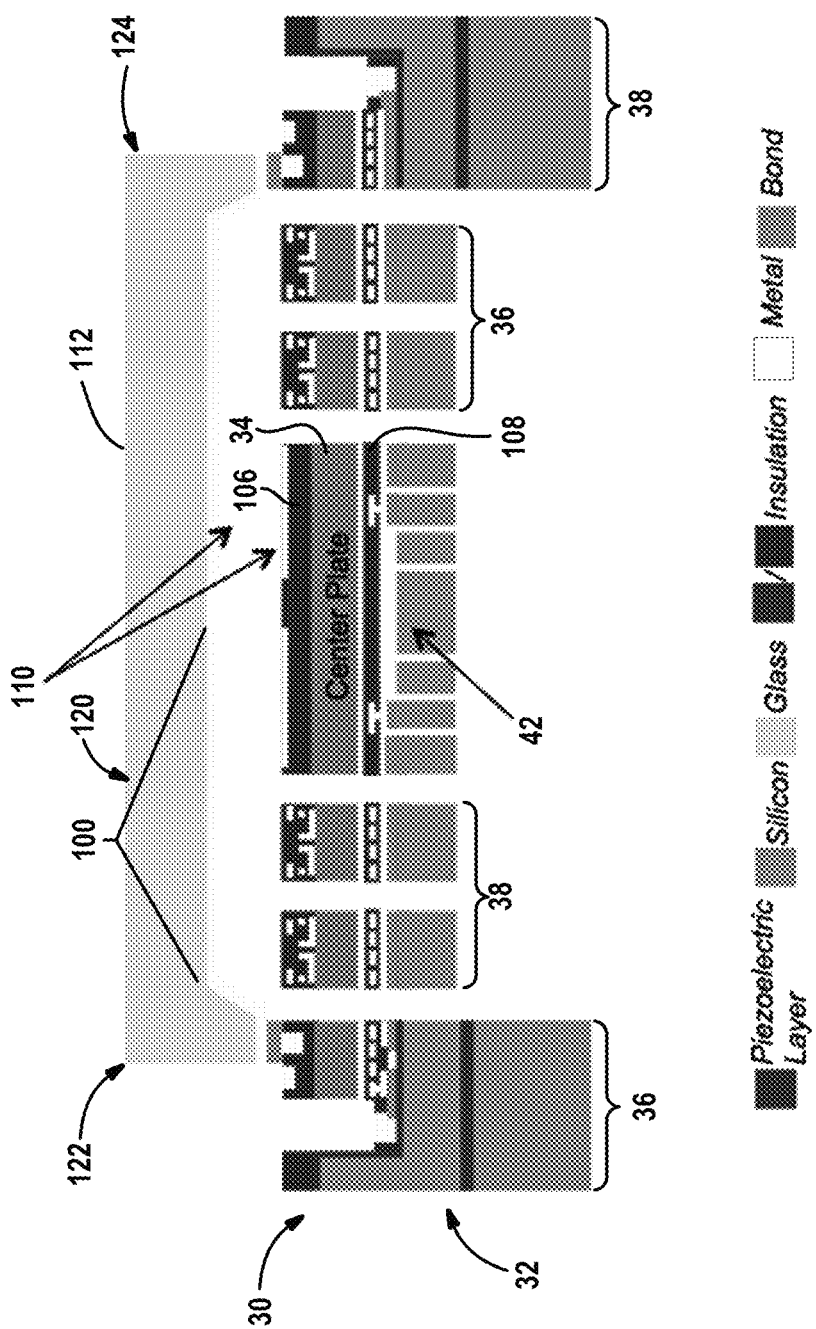

In another embodiment, as seen in FIGS. 12A-12C, the capacitive sensing elements 100 are disposed on a fixed member 102 that opposes the actuation plate 34 and is attached to the primary frame 36. The fixed member 102 is a predetermined distance from the actuation plate 34. For example, the fixed member may be 0.1 to 100 micrometers from the actuation plate 34. A smaller predetermined distance provides greater sensitivity and signal amplitude from the capacitive sensing elements 100. A large predetermined distance allows for a greater range of motion of the actuation plate 34.

Figure 13C:
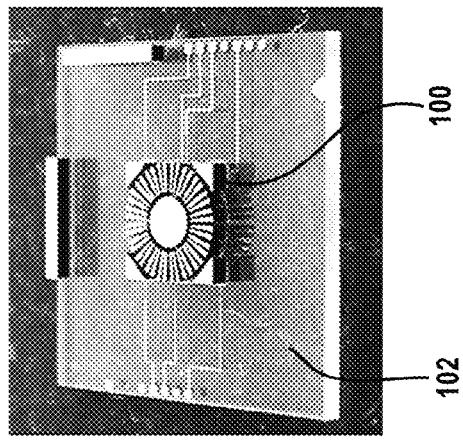
FIGS. 13A-13C are exemplary fixed members with specifically arranged capacitive sensing elements.
Figure 13B:
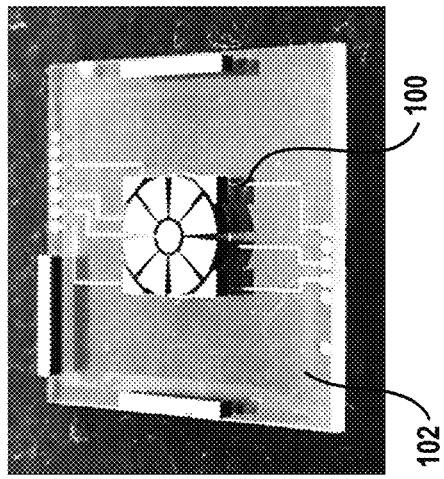
Figure 13A:
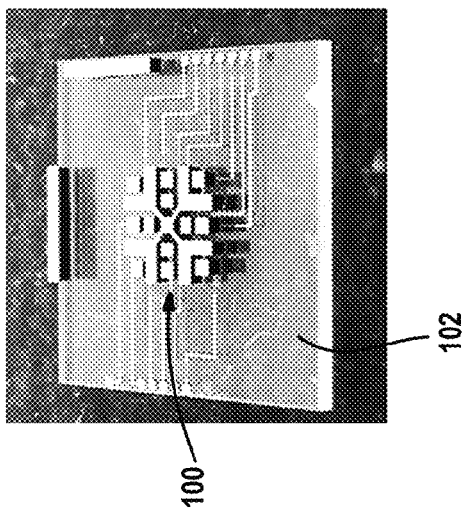

The capacitive sensing elements 100 are arranged in a specific geometry to provide a combination of analog and threshold position sensing outputs. For threshold sensing, there should an overlapping of electrodes when the actuation plate 34 moves to a critical angle, allowing for the detection of maximum and minimum peak capacitance values. FIG. 13A depicts a fixed member 102 having an arrangement of capacitive sensing elements 100 for sensing out-of-plane rotational motion. FIGS. 13B and 13C both depict a fixed member 102 having an arrangement of capacitive sensing elements 100 for sensing in-plane rotational motion. It is acknowledged that other geometries may be used that serve the same or additional purposes.

The analog sensing outputs provide an estimation of the motion trajectory at all sampling points. However, the analog output signals are susceptible to gain errors due to aging, temperature, dielectric charging, and environmental noise. Comparatively, the threshold sensing outputs provide high accuracy velocity measurements at only certain fixed points in the motion trajectory. However, the threshold sensing outputs are relatively insensitive to sensor gain errors, temperature changes, and environmental noise. Threshold sensing outputs are obtained by detecting peak capacitances between sets of electrodes that are symmetric about the center of the actuation plate 34 while in motion.

A combination of analog and threshold sensing outputs are used to produce accurate sensing of the certain positions of the actuation plate 34 and its associated motion speed. To ensure accuracy the analog sensing outputs are adjusted to match the threshold sensing outputs and to optimally reconstruct the measured motion. FIG. 14A depicts the analog sensor measurements prior to adjustment and with variable gain due to environment and aging. FIG. 14B depicts the reconstructed trajectory, wherein the analog measurements have been adjusted to match the threshold measurements.

In another embodiment, the capacitive sensing elements 100 are arranged to provide only threshold position sensing outputs (not shown). In such instances, the threshold detection errors should be made to be no worse than the threshold timing clock resolution. However, in such instances, the threshold position sensing outputs may contain threshold sensing currents resulting in artificially high detection errors. To reduce possible error the number of threshold sensors can be increased. Alternatively, the range-of-motion of the actuation plate 34 can be increased.

In sum, FIG. 12A depicts a micro-system 30 comprising an actuator 32, a fixed member 102, and an inertial sensor 42. The actuator 32 comprises an actuation plate 34, a primary frame 36, and a plurality of connecting member 38. The actuation plate 34 has a first surface 106 opposing a second surface 108. The inertial sensor 42 is attached to or integrated into the first surface of the actuation plate 106. A plurality of partitioned surface electrodes 58 is disposed on the second surface of the actuation plate 108. The fixed member 102 is formed of a non-conduction substrate and is a rectangular cuboid. The fixed member 102 is coupled to the primary frame 36. An alignment pin 104 may be used to couple the fixed member 102 to the primary frame 36.

The fixed member 102 has a first surface 110 opposing a second surface 112. The first surface of the fixed member 110 opposes the second surface of the actuation plate 108. A plurality of capacitive sensing elements 100 is disposed on the first surface of the fixed member 102. The capacitive sensing elements 100 disposed on the fixed member 102 oppose the plurality of partitioned surface electrodes 58 disposed on the second surface of the actuation plate 108. The capacitive sensing elements 100 are specifically arranged to provide both analog sensing outputs and threshold sensing outputs. The capacitive sensing elements 100 are arranged in three groups, a first outside group 114, a second center group 116, and a third remaining group 118. The outside capacitive sensing elements 100 provide analog sensing outputs resulting from X-Y-translational motion. The center capacitive sensing element 116 provides analog sensing outputs resulting from Z-translational motion. The remaining capacitive sensing elements 118 provide X-Y-tilt or Z-tilt threshold sensing outputs.

In sum, FIG. 12B depicts a micro-system 30 comprising an actuator 32, a fixed member 102, and an inertial sensor 42. The actuator 32 comprises an actuation plate 34, a primary frame 36, and a plurality of connecting member 38. The actuation plate 34 has a first surface 106 opposing a second surface 108. The inertial sensor 42 is attached to or integrated into the first surface of the actuation plate 106. A plurality of partitioned surface electrodes 58 is disposed on the second surface of the actuation plate 108. The fixed member 102 has a first surface 110 opposing a second surface 112. The first surface of the fixed member 110 opposes the second surface of the actuation plate 108. A plurality of capacitive sensing elements 100 is disposed on the first surface of the fixed member 102. The capacitive sensing elements 100 disposed on the fixed member 102 oppose the plurality of partitioned surface electrodes 58 disposed on the second surface of the actuation plate 108. The capacitive sensing elements 100 are metal electrodes.

The fixed member 102 is formed of a non-conduction substrate. The fixed member 102 has a first portion 120, a second portion 122, and a third portion 124. The first portion 120 is positioned between the second portion 122 and the third portion 124. The second portion 122 and third portion 124 of the fixed member 102 are coupled to the primary frame 36. The first portion 120 is a predetermined distance away from the actuator 32.

In sum, FIG. 12C depicts a micro-system 30 comprising an actuator 32, a fixed member 102, and an inertial sensor 42. The actuator 32 comprises an actuation plate 34, a primary frame 36, and a plurality of connecting member 38. The actuation plate 34 has a first surface 106 opposing a second surface 108. The inertial sensor 42 is attached to or integrated into the second surface of the actuation plate 108. A plurality of partitioned surface electrodes 58 is disposed on the first surface of the actuation plate 106. The fixed member 102 has a first surface 110 opposing a second surface 112. The first surface of the fixed member 110 opposes the first surface of the actuation plate 106. A plurality of capacitive sensing elements 100 is disposed on the first surface of the fixed member 102. The capacitive sensing elements 100 disposed on the fixed member 102 oppose the plurality of partitioned surface electrodes 58 disposed on the second surface of the actuation plate 108. The capacitive sensing elements 100 are metal electrodes.

The fixed member 102 is formed of a non-conduction substrate. The fixed member 102 has a first portion 120, a second portion 122, and a third portion 124. The first portion 120 is positioned between the second portion 122 and the third portion 124. The second portion 122 and third portion 124 of the fixed member 102 are coupled to the primary frame 36. The first portion 120 is a predetermined distance away from the actuator 32.

The micro-system 30 may further include piezoresistive sensing elements 126 for estimation of the motion trajectory of the actuation plate 34. The piezoresistive sensing elements 126 can be integrated apart from or in addition to the piezoelectric sensing signals and the capacitive sensing elements 100. The piezoresistive sensing elements 126 allow for linear signal outputs and greater stability against aging as compared to piezoelectric sensing signals.

Figure 15A:
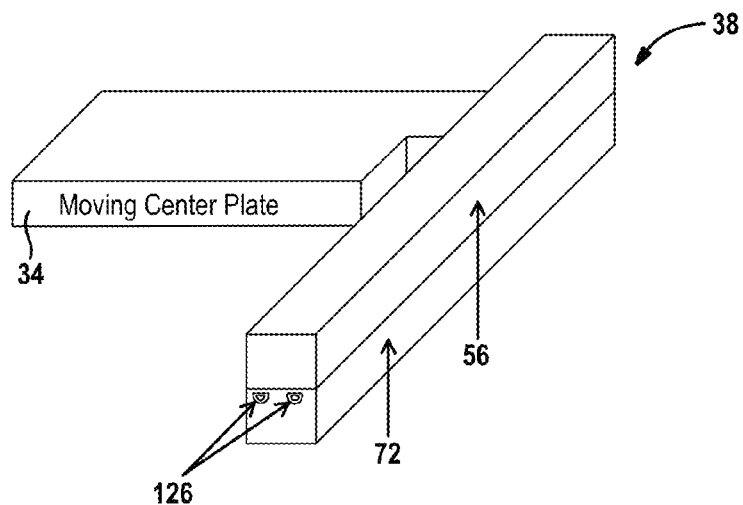
FIG. 15A-15B are cross-sectional views of exemplary micro-systems having integrated piezo-resistive sensing elements.

In one embodiment, as seen in FIG. 15A, the piezoresistive sensing elements 126 can be integrated into the connecting members 38 attached to the actuation plate 34. The piezoresistive sensing elements 126 are integrated into the non-piezoelectric material 72 of the connecting members 38 having a unimorph structure. The piezoresistive sensing elements 126 are integrated at positions of the connecting member 38 where high strain values are generated during actuation.

Figure 15B:
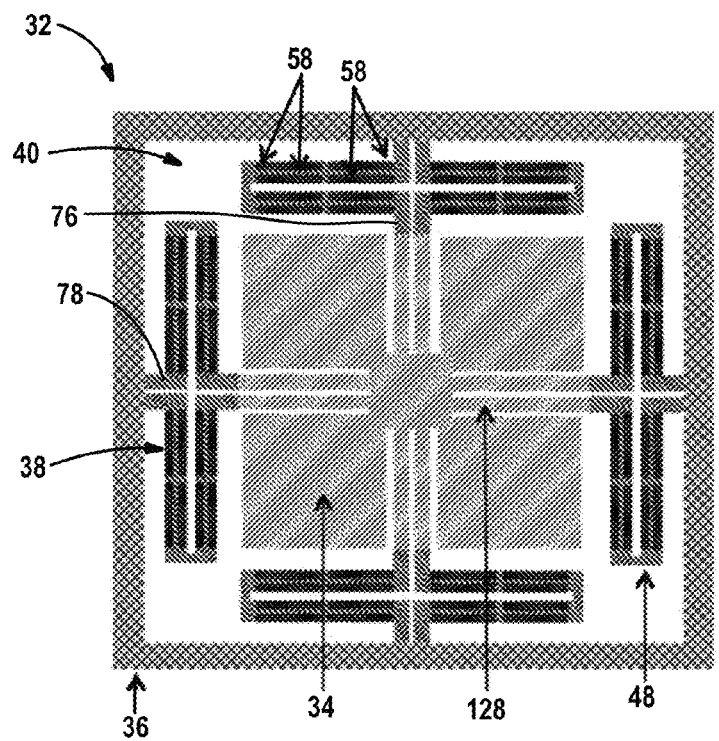

In another embodiment, as seen in FIG. 15B, the actuator 32 may include an additional set of connecting members 128 wherein the piezoresistive sensing elements 126 are integrated. FIG. 15B, depicts an actuator 32 having an actuation plate 34, a primary frame 36, a plurality of connecting members 38, and an additional set of connecting members 128. The primary frame 26 defines an inner portion 40. The actuation plate 34, the plurality of connecting members 38, and the additional set of connecting members 128 are disposed within the inner portion 40. Each connecting member 38 has a corresponding perpendicular additional connecting member 128. The piezoresistive sensing elements 126 are integrated onto each of the additional connecting member 128. The additional set of connecting members 128 has a lower stiffness as compared to the plurality of connecting members 38.

The micro-system 30 further includes at least one controller (not shown). The controller is part of the interface circuitry. The controller may be a micro-chip, an embedded system, computer hardware, a printed circuit board, or a stand-alone device. The controller includes processors, data storage units, input/output ports, communication interfaces, analog-to-digital converters, digital-to-analog converters, clock generators, timers, and other peripherals. The controller interfaces with the micro-system 30 and provides the electrical excitation signals to the actuator 32. The controller receives and processes the signals from the position sensing elements, including any piezoelectric sensing signals or signals from the capacitive sensing elements 100 or the piezoresistive sensing elements 126, and calculates the trajectory of the motion of the actuation plate 34. The controller also receives data from the inertial sensors and may provide analog or digital electrical signals intermittently or continuously back to the inertial sensor for its desired operation. The controller processes data received from the position sensing elements and the inertial sensor 42. The controller uses the processed data to calibrate the output of the attached or monolithically integrated sensors.

Figure 16:
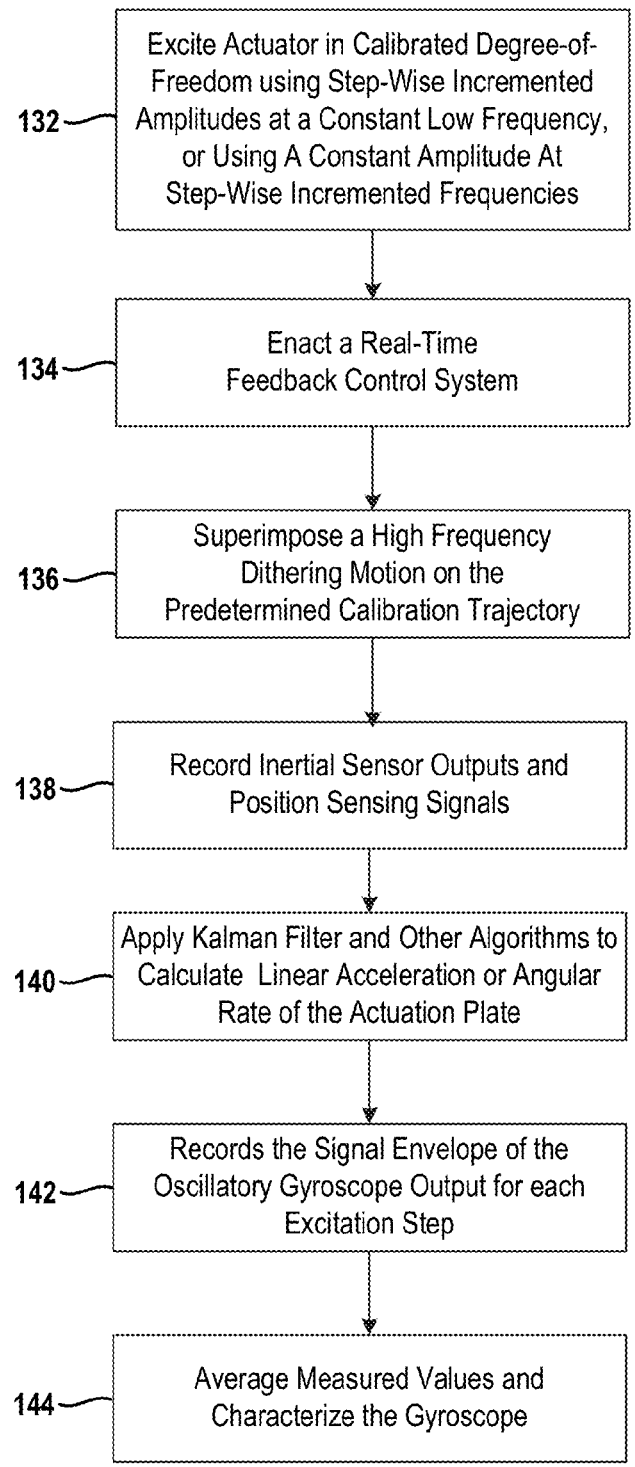
FIG. 16 is a flowchart that sets for an example method of scale-factor calibration of an inertial sensor.

The micro-system 30 allows for scale-factor calibration of the attached or monolithically integrated inertial sensor 42. FIG. 16 depicts an exemplary calibration method when the attached or monolithically integrated inertial sensor 42 is a gyroscope. At 132, the actuator 32 is excited at step-wise incremented amplitudes at a constant low frequency. For example, the actuator 32 may be excited using step-wise incremented amplitudes at a constant frequency of 100 Hz. The actuator is excited according to the predetermined degree-of-freedom for which the tested inertial sensor is calibrated.

At 134, after the initial excitation of the actuator 32, a real-time feedback control system is enacted to minimize any undesired off-axis motion of the actuation plate 34 and to maintain the motion of the actuation plate 34 along the predetermined calibration trajectory. At 136, after the feedback control system is enacted, a high frequency dithering motion is superimposed on the predetermined calibration trajectory to improve threshold sensing accuracy. At 138, after the high frequency dithering motion is superimposed, the inertial sensor 42 outputs and position sensing signals are simultaneously recorded. The capacitive sensing elements 100 provide analog sensing signals and threshold sensing signals. At 140, after the inertial sensor 42 outputs and position sensing signals are recorded, a Kalman filter is used to adjust the position and velocity estimates from the analog sensing signals to satisfy the measured crossing times of known critical positions from the threshold sensing signals. The linear acceleration of the gyroscope is then calculated using the recorded position sensing signals.

At 142, after the Kalman filter is applied and the linear acceleration is determined, the signal envelope of the gyroscope is extracted. Data samples of the maxima and minima are collected for each excitation step. At 144, after the signal envelope of the gyroscope is extracted the measured responses are averaged and used to characterize the output of the gyroscope with respect to the applied angular rate or linear acceleration. The scale-factor and off-set values of the gyroscope are determined.

The calibration method depicted in FIG. 16, can be repeated at different actuation frequencies to obtain the frequency response of the attached or monolithically integrated inertial sensor 42.

Figure 17:
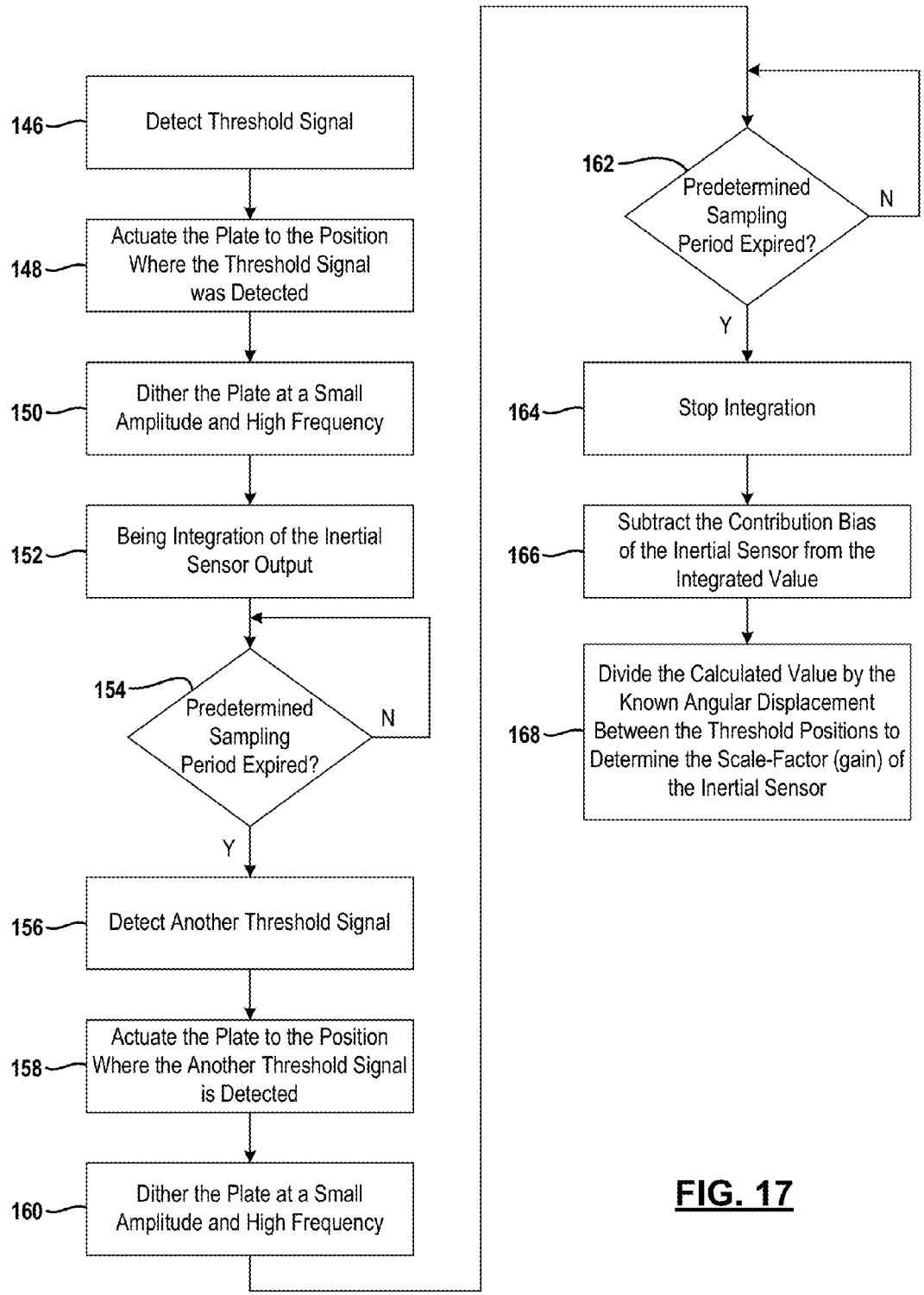
FIG. 17 is a flowchart that sets for an example method of scale-factor calibration of an inertial sensor.

FIG. 17 depicts an alternative calibration method. In this instance, at 146, the threshold signal is first detected. At 148, after the threshold signal is first detected, the actuation plate 34 is actuated to the position where the threshold signal was detected. At 150, after the actuation plate 34 is actuated, the actuation plate 34 is dither at a small amplitude and a high frequency for a predetermined sampling period. At 152, a controller circuit begins to integrate the inertial sensor 42 output. At 154, if the predetermined sampling period has expired the process proceeds to 156. If the predetermined sampling period has not expired the process remains at 152.

At 156, after the predetermined sampling period has expired, another threshold signal is detected. At 158, after the another threshold signal is detected, the actuation plate 34 is actuated to the second position where the another threshold signal was detected. At 160, the actuation plate 34 is again dithered at a small amplitude and a high frequency for a predetermined sampling period. At 162, if the predetermined sampling period has expired the process proceeds to 164. If the predetermined sampling period has not expired the process remains at 160.

At 164, after the second predetermined sampling period has expired, the controller circuit stops integrating the inertial sensor 42 output. At 166, after integration has been stopped, the contribution of bias of the inertial sensor 42 is subtracted from the integrated value. At 168, the calculated value is divided by the known angular displacement between the threshold points to determine the scale-factor (gain) of the attached or monolithically integrated inertial sensor 42.

The velocity estimates from the position sensing signals of the actuation plate 34 is less accurate than the precision rate tables, which generally achieve an error of 1 ppm. However, the measured actuation plate 34 motion is an improvement on the use of the inertial sensor 42 independently and can be used to calibrate the inertial sensor 42 output. The micro-system generalizes calibration of arbitrary and lower cost micro-inertial sensors, particularly micro-gyroscopes. Through the use of threshold sensing and an iterative learning control scheme, the estimated error in gain calibration of the inertial sensors is decreased to 10-100 ppm, which is a significant improvement over the long-term gain stability of most MEMS inertial sensors.

The micro-system 30 in additional to allowing for in situ calibration of the attached or monolithically integrated inertial sensor 42 may be used for passive or active damping of undesired mechanical motions of the actuation plate 34. Vibrational damping allows for increased performance of the sensors attached or monolithically integrated on the actuation plate 34 by decreasing the mechanical noise. Vibrational damping allows for increased performance of the inertial sensor 42 attached or monolithically integrated on the actuation plate 34 by decreasing the mechanical noise.

In the instance of passive vibration damping, the cyclic mechanical motion of the actuation plate 34 causes a change in the strain placed on the connecting members 38. The strain generates electrical energy on the partitioned surface electrodes 58 disposed on the first surface of the first piezoelectric material 62 of the plurality of connecting members 38. The generated electrical energy is converted into heat. The electrical energy may be converted into heat through the use of external resistors.

Active vibration damping generally performs better than passive vibration damping. However, active vibration damping requires some power consumption. In the instance of active vibration damping, integrated sensing elements are used to define the electrical signals that are applied to the partitioned surface electrodes 58. The applied electrical signal cause the partitioned surface electrodes 58 to generate a counter force on the actuation plate 34 have the same amplitude as the actuation plate 34. The counter force applied to the actuation plate 34 by the partitioned surface electrodes 58 is in the opposite direction to the force imposed on the actuation plate 34 by any external environmental vibrations.

Figure 18A:
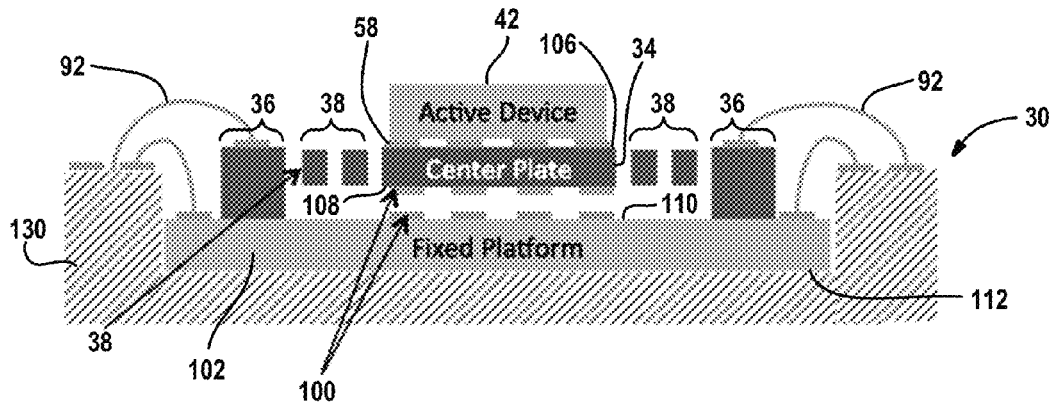
FIG. 18A is a cross-sectional view of an exemplary micro-system having capacitive sensing elements on a fixed member.
Figure 18B:
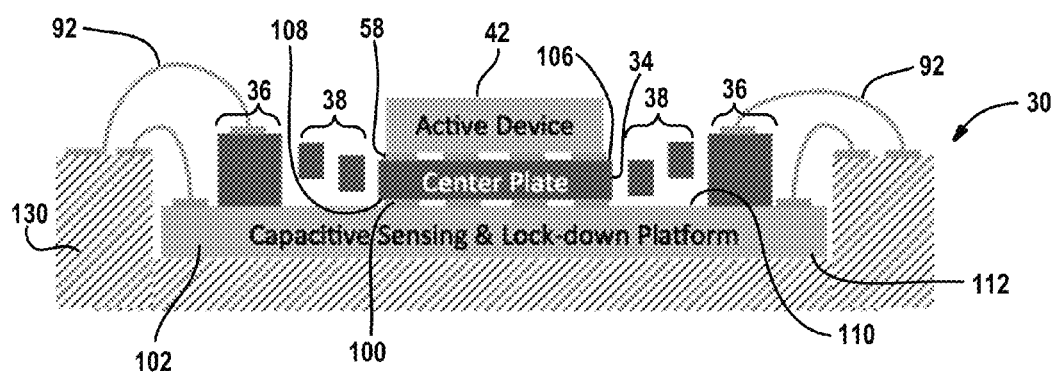
FIG. 18B is a cross-sectional view of an exemplary micro-system of FIG. 18A where the actuation plate is locked in position.

When the actuation plate 34 is not actuated and not used for the calibration, the fixed member 102 is used to provide active protection of the actuation plate 34 against environmental mechanical shocks. As seen in FIG. 18A, the micro-system 30, comprising an actuator 32 and an attached or monolithically integrated inertial sensor 42, forms a spring-mass system with relatively low resonance frequency. As a result, the micro-system 30 is susceptible to mechanical damage during large deflections caused by external shocks. To reduce motion of the actuation plate 34, when the actuation plate 34 is not actuated and not used for calibration, the actuation plate 34 is electrostatically pull to the fixed member 102 and locked in position, as seen in FIG. 18B. The lock-down position beneficially prevents excess stress from being generated on the connecting members 38 during a shock.

FIG. 18A depicts a micro-system 30 having an actuator 32, an attached or monolithically integrated inertial sensor 42, and a fixed member 102. The actuator 32 comprises an actuation plate 34, a primary frame 36, and a plurality of connecting members 38. The actuation plate 34 has a first surface 106 opposing a second surface 108. A plurality of partitioned surface electrodes 58 is disposed on the second surface 108 of the actuation plate 34. The fixed member 102 form is attached to the primary frame 36 and has a first surface 110 opposing a second surface 112. A plurality of capacitive sensing elements 100 is disposed on the first surface of the fixed member 110. The plurality of capacitive sensing elements 100 disposed on the first surface of the fixed member 110 opposing the plurality of partitioned surface electrodes 58 disposed on the second surface of the actuation plate 108. The micro-system 30 is disposed with a single device packaging 130.

FIG. 18B depicts the micro-system 30 of FIG. 18A, when an electrostatic pull-down force has been applied between the capacitive sensing elements 100 disposed on the first surface of the fixed member 110 and the plurality of partitioned surface electrodes 58 disposed on the second surface of the actuation plate 108. In such instances, the actuation plate 34 is locked in position, so to reduce motion of the actuation plate 34 and prevent excess stress on the connecting members 38 when the actuation plate 34 is not actuated and not used for the calibration.

In other embodiments, the actuation plate 34 may be similarly locked-down when the actuator 32 is not being used for active or passive vibration damping. In such instances, the electrostatic lock-down feature can be used to prevent possible performance degradation of the attached or monolithically integrated inertial sensor 42 resulting from coupled or amplified external vibration noise.

The micro-system 30 is operable in multiple axes and can be integrated with and used to test the inertial sensor 42 within a single device packaging. The single device packaging provides electrical connections to the micro-system 30 and serves as a mechanical and electrical adaptor between the micro-system 30 and other systems. The single device packaging provides protection against environmental particles and external mechanical shocks. The single device packaging also stabilizes the temperature of the micro-system 30. The single device packaging may be hermetically sealed.

Figure 19:
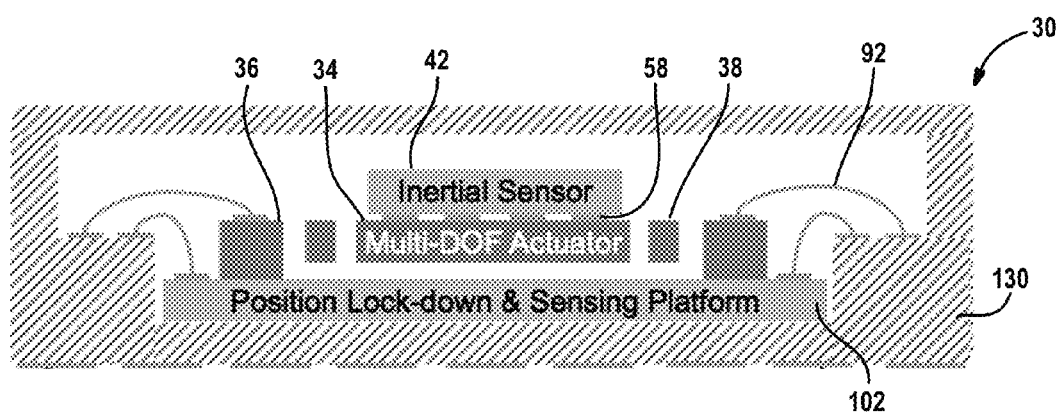
FIG. 19 is a cross-sectional view of an exemplary micro-system encapsulated by a single device packaging.

For example, FIG. 19 depicts an micro-system 30 comprising an inertial sensor 42 attached on or integrated into a actuation plate 34; a fixed member 102 attached to a primary frame 36; and a plurality of wire bonds forming electrical interconnects between the fixed member 102 and a device packaging 130 and between the primary frame 36 and the device packaging. The primary frame 36 is fixed with respect to the device packaging.

In another embodiment (not shown), the micro-system 30 can be adapted as a universal system-in-package solution, which can provide precise physical reference inputs in the full sensing range for calibration of the inertial sensors 42.

In another embodiment (not shown), the micro-system 30 and can be used as an advanced vibration isolation package, which provides active damping of high-frequency ambient vibrations and acts as a low-pass filtering system for MEMS inertial sensors.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A micro-system for in situ calibration having integrated multi-axis actuation and position sensing capabilities, comprising:
   a plate;
   a primary frame defining an inner space in which the plate is disposed;
   a plurality of connecting members disposed within the inner space and arranged around the plate, wherein each connecting member, in response to an applied stimuli, allows for movement of the plate in any of three geometric axes that are perpendicular to each other, each connecting member has a first end and a second end with the first end being attached to the plate, each connecting member is elastic and includes a piezoelectric element having a first surface opposing a second surface, where a plurality of partitioned surface electrodes are disposed on at least the first surface of the piezoelectric element;
   at least one primary sensor coupled to or integrated into the plate;
   a plurality of sensing elements that detect a motion trajectory of the plate; and
   a controller electrically connected to each of the connecting members and to each of the sensing elements in the plurality of sensing elements, wherein the controller is configured to actuate the plate by providing the applied stimuli to one or more of the plurality of connecting members while concurrently sensing motion of the plate from input received from the plurality of sensing elements.

2. The micro-system of claim 1, wherein a common geometric plane passes through the plate, the primary frame, each of the plurality of connect members, and the two largest dimensions of one of the plurality of connecting members defines a geometric plan parallel to the common geometric plane.

3. The micro-system of claim 1, further comprising:
   a fixed member having a first surface opposing a second surface,
   wherein the first surface of the fixed member opposes the plate, the plurality of sensing elements includes a plurality of capacitive sensing elements, the plurality of capacitive sensing elements are disposed on the first surface of the fixed member, the plurality of capacitive sensing elements faces the plate, and the plurality of capacitive sensing elements is symmetrically arranged to provide position sensing outputs that the controller uses to estimate the motion trajectory of the plate.

4. The micro-system of claim 1, wherein the plurality of sensing elements, further comprises:
a plurality of piezoresistive sensing elements, wherein the plurality of piezoresistive sensing elements are integrated into the plurality of connecting members, and the controller uses signals from the plurality of piezoresistive sensing elements for estimation of the motion trajectory of the plate.

5. The micro-system of claim 1, wherein the plurality of connecting members includes:
a first group of connecting members that provides vibratory tilting motion of the plate around a predetermined reference axis;
a second group of connecting members that is used for integrated sensing of the applied reference stimuli; and
a third group of connecting members that is used for compensation of any off-axis motion of the plate other than the desired motion around the predetermined reference axis, wherein
a piezoelectric sensing signal is obtained from one of the plurality of partitioned surface electrodes or from the difference between the outputs of two partitioned surface electrodes from the second group of connecting members, and
the controller uses piezoelectric sensing signals to estimate the motion trajectory of the plate.

6. The micro-system of claim 1, further comprising:
a feedback control system, wherein the feedback control system interacts with the connecting members, the plate, and the plurality of sensing elements to create a motion trajectory of the plate and to determine at least one device parameter, including a scale-factor, a bias, a cross-axis sensitivity, a linearity and frequency response, or the angular rate and linear acceleration of the primary sensor.

7. The micro-system of claim 1, further comprising:
a feedback control system, wherein the feedback control system interacts with the connecting members, the plate, and the plurality of sensing elements to dampen undesired motion of the plate with respect to the primary frame and to improve the performance of the micro-system.

8. The micro-system of claim 1, wherein electrical connections are formed by a plurality of flexible cables extending from the plate to the primary sensor.

9. The micro-system of claim 1, wherein each connecting member has an L-shape layout or a U-shaped layout.

10. The micro-system of claim 1, wherein each connecting member has a rectangular cross-section or a T-shaped cross-section.

11. The micro-system of claim 1, further comprising:
a secondary frame disposed within the inner space,
a first set of connecting members that attach the plate to the secondary frame; and
a second set of connecting members that attach the secondary frame to the primary frame.

12. The micro-system of claim 1, wherein the system is encapsulated in a single device package.

13. The micro-system of claim 1, wherein the system is hermetically sealed.

14. A micro-system for in situ calibration having integrated multi-axis actuation and position sensing capabilities, comprising:
a plate;
a frame defining an inner space in which the plate is disposed;
a plurality of connecting members disposed within the inner space and arranged around the plate, wherein each connecting member, in response to a reference signal, allows for movement of the plate in any of three geometric axes that are perpendicular to each other, each connecting member has a first end and a second end, the first end being attached to the plate, each connecting member is elastic and includes a piezoelectric element having a first surface opposing a second surface, where a plurality of surface electrodes are disposed on at least the first surface of the piezoelectric element;
an inertial sensor coupled to or integrated into the plate;
a fixed member having a first surface opposing a second surface, wherein the first surface opposes the plate, and a plurality of capacitive sensing elements is disposed on at least the first surface of the fixed member and the plurality of capacitive sensing elements are specifically arranged to allow the reference signal to be determined;
a feedback control system, wherein the feedback control system interacts with the connecting members, the plate, and the plurality of capacitive sensing elements to create a specific motion trajectory of the plate; and
a controller electrically coupled to the each of the connecting members and each of the plurality of capacitive sensing elements, the controller is configured to actuate the plate by providing the reference signal to one or more of the plurality of partitioned surface electrodes and to concurrently receive sensing signals from the plurality of capacitive sensing elements and output signals from the inertial sensor,
wherein the controller uses the signals obtained from the plurality of capacitive sensing elements to estimate the motion trajectory of the plate; uses the signals from the capacitive sensing elements to determine at least one device parameter; and uses the inertial sensor outputs, the reference signals, and the determined device parameter to calibrate the output signal of the inertial sensor, and
wherein a common geometric plane passes through the plate, the primary frame, each of the plurality of connect members, and the two largest dimensions of the plurality of connecting members defines a geometric plane parallel to the common geometric plane.

15. The micro-system of claim 14, wherein the system is encapsulated in a single device package and the single device packaging keeps the plate and the inertial sensor at a constant temperature.

16. The micro-system of claim 14, further comprising:
a plurality of piezoresistive sensing elements, wherein the plurality of piezoresistive sensing element is integrated into the plurality of connecting members, and the controller uses signals from the plurality of piezoresistive sensing elements to estimate the motion trajectory of the plate and to determine the device parameters.

17. The micro-system of claim 16, wherein the feedback control system uses the plurality of connecting members and the plurality of piezoresistive sensing elements to dampen undesired motion of the plate with respect to the primary frame and to improve the performance of the micro-system.

18. The micro-system of claim 14, wherein the plurality of connecting members includes:
- a first group of connecting members that provides vibratory tilting motion of the plate around a predetermined reference axis;
- a second group of connecting members that is used for integrated sensing of the applied reference stimuli; and
- a third group of connecting members that is used for compensation of any off-axis motion of the plate other than the desired motion around the predetermined reference axis, wherein
- a piezoelectric sensing signal is obtained from one of the plurality of partitioned surface electrodes or from the difference between the outputs of two partitioned surface electrodes from the second group of connecting members, and
- the controller uses piezoelectric sensing signals to estimate the motion trajectory of the plate and to determine device parameters.

19. The micro-system of claim 18, wherein the feedback control system uses the plurality of connecting members and the piezoelectric sensing signals to dampen undesired motion of the plate with respect to the primary frame and to improve the performance of the micro-system.

20. The micro-system of claim 14, wherein the controller adjusts the voltage amplitudes applied on the plurality of partitioned surface electrodes to create a counter displacement that reduces any undesired off-axis tilting motion.

21. The micro-system of claim 14, wherein the plurality of capacitive sensing elements is electrically excited causing the plate to be pulled to the fixed member and locked in position with respect to the frame.

* * * * *